US011354511B2

(12) United States Patent
Negishi

(10) Patent No.: US 11,354,511 B2
(45) Date of Patent: Jun. 7, 2022

(54) INFORMATION PROCESSING DEVICE, INFORMATION PROCESSING METHOD, AND RECORDING MEDIUM

(71) Applicant: SONY CORPORATION, Tokyo (JP)

(72) Inventor: Atsushi Negishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 213 days.

(21) Appl. No.: 16/623,508

(22) PCT Filed: Apr. 26, 2018

(86) PCT No.: PCT/JP2018/016902
§ 371 (c)(1),
(2) Date: Dec. 17, 2019

(87) PCT Pub. No.: WO2019/003616
PCT Pub. Date: Jan. 3, 2019

(65) Prior Publication Data
US 2021/0150145 A1  May 20, 2021

(30) Foreign Application Priority Data

Jun. 26, 2017 (JP) .............................. JP2017-123953

(51) Int. Cl.
| | |
|---|---|
| *G06F 40/30* | (2020.01) |
| *G06F 40/58* | (2020.01) |
| *G06F 3/01* | (2006.01) |
| *G06F 3/16* | (2006.01) |
| *G06K 9/62* | (2022.01) |

(Continued)

(52) U.S. Cl.
CPC .............. *G06F 40/30* (2020.01); *G06F 40/58* (2020.01)

(58) Field of Classification Search
CPC . G06F 3/01; G06F 3/011; G06F 3/013; G06F 3/167; G06F 3/16; G06F 40/30; (Continued)

(56) References Cited

U.S. PATENT DOCUMENTS

| | | | |
|---|---|---|---|
| 2012/0206322 A1* | 8/2012 | Osterhout | .......... G02B 27/0093 345/8 |
| 2013/0304451 A1 | 11/2013 | Sarikaya et al. | |

(Continued)

FOREIGN PATENT DOCUMENTS

| | | |
|---|---|---|
| CN | 104412260 A | 3/2015 |
| EP | 2847689 A2 | 3/2015 |

(Continued)

OTHER PUBLICATIONS

International Search Report and Written Opinion of PCT Application No. PCT/JP2018/016902, dated Jul. 17, 2018, 13 pages of ISRWO.

*Primary Examiner* — Leshui Zhang
(74) *Attorney, Agent, or Firm* — Chip Law Group

(57) ABSTRACT

Provided is an information processing device including a control section that recognizes an intention of a first action subject on a basis of an action performed by the first action subject in a first context, generates information indicating the intention of the first action subject in a second context of the second action subject, and causes the information to be outputted to the second action subject. The first action subject is one of a user or a communication target of the user. The second action subject is another of the user or the communication target of the user.

15 Claims, 12 Drawing Sheets

(51) Int. Cl.
*G06V 40/20* (2022.01)
*G10L 13/00* (2006.01)
*G10L 15/00* (2013.01)

(58) Field of Classification Search
CPC ......... G06F 40/58; G06F 3/017; G10L 15/22;
G10L 13/00; G10L 15/00; G02B 27/017;
G06K 9/00; G06K 9/00355; G06K
9/6288; G06K 9/62
USPC .................................................. 704/2–5, 8–9
See application file for complete search history.

(56) References Cited

U.S. PATENT DOCUMENTS

2014/0086428 A1* 3/2014 Kim ................... H04M 1/6066
381/74
2017/0162190 A1* 6/2017 Wakaki ............... G10L 15/1815
2017/0243600 A1 8/2017 Teshima

FOREIGN PATENT DOCUMENTS

| | | | |
|---|---|---|---|
| EP | 3220372 A1 | 9/2017 | |
| JP | 07-092938 A | 4/1995 | |
| JP | 07092938 A * | 4/1995 | ............... G09G 5/00 |
| JP | 07-092938 B2 | 10/1995 | |
| JP | 2001-117921 A | 4/2001 | |
| JP | 2002-259369 A | 9/2002 | |
| JP | 2002-259377 A | 9/2002 | |
| JP | 2004-254218 A | 9/2004 | |
| JP | 2004254218 A * | 9/2004 | ............... H04M 1/00 |
| JP | 2005-267117 A | 9/2005 | |
| JP | 2015-523623 A | 8/2015 | |
| KR | 10-2015-0005608 A | 1/2015 | |
| TW | 201403471 A | 1/2014 | |
| WO | 2013/169530 A2 | 11/2013 | |
| WO | 2016/075781 A1 | 5/2016 | |

* cited by examiner

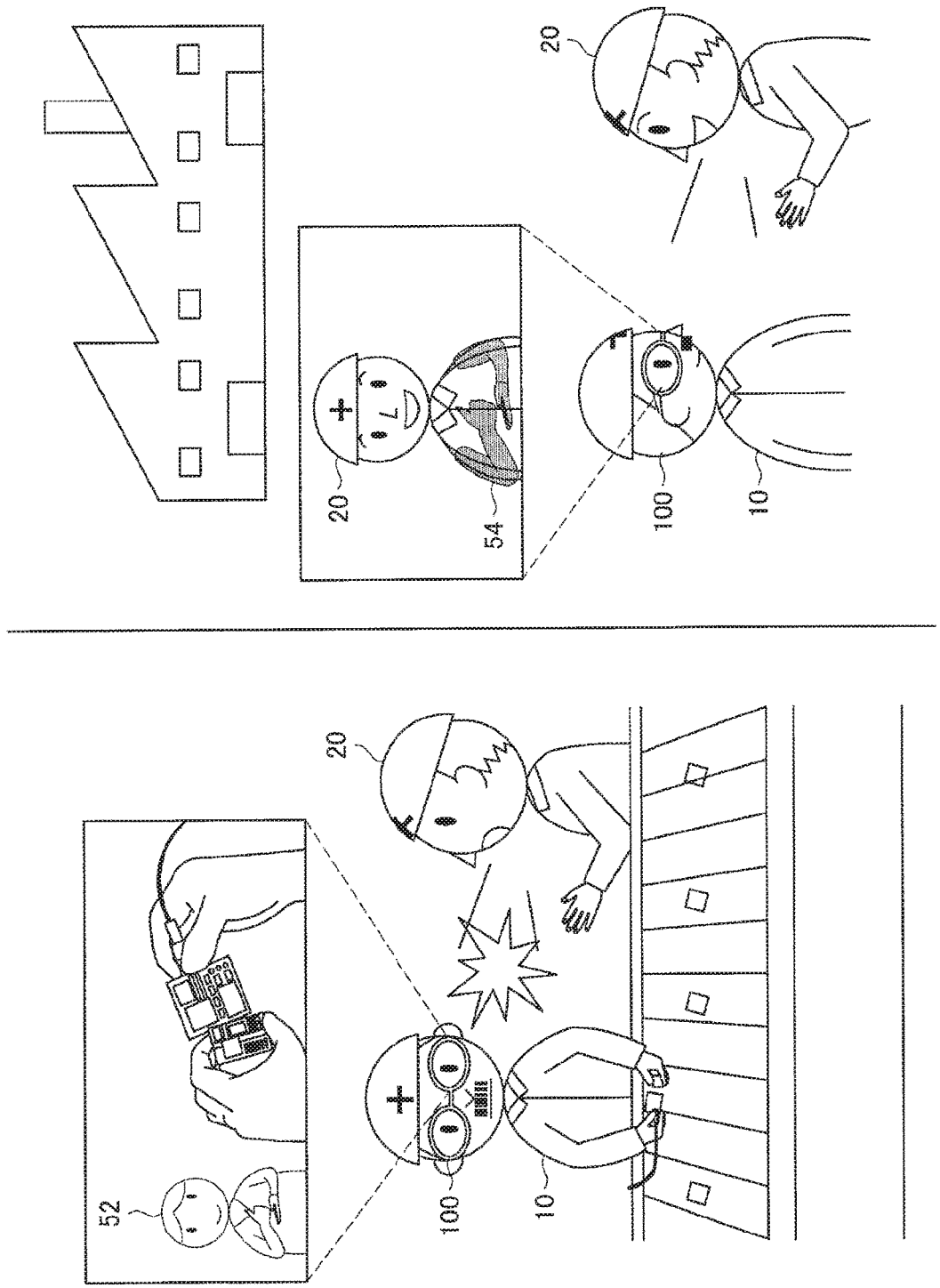
[FIG. 9]

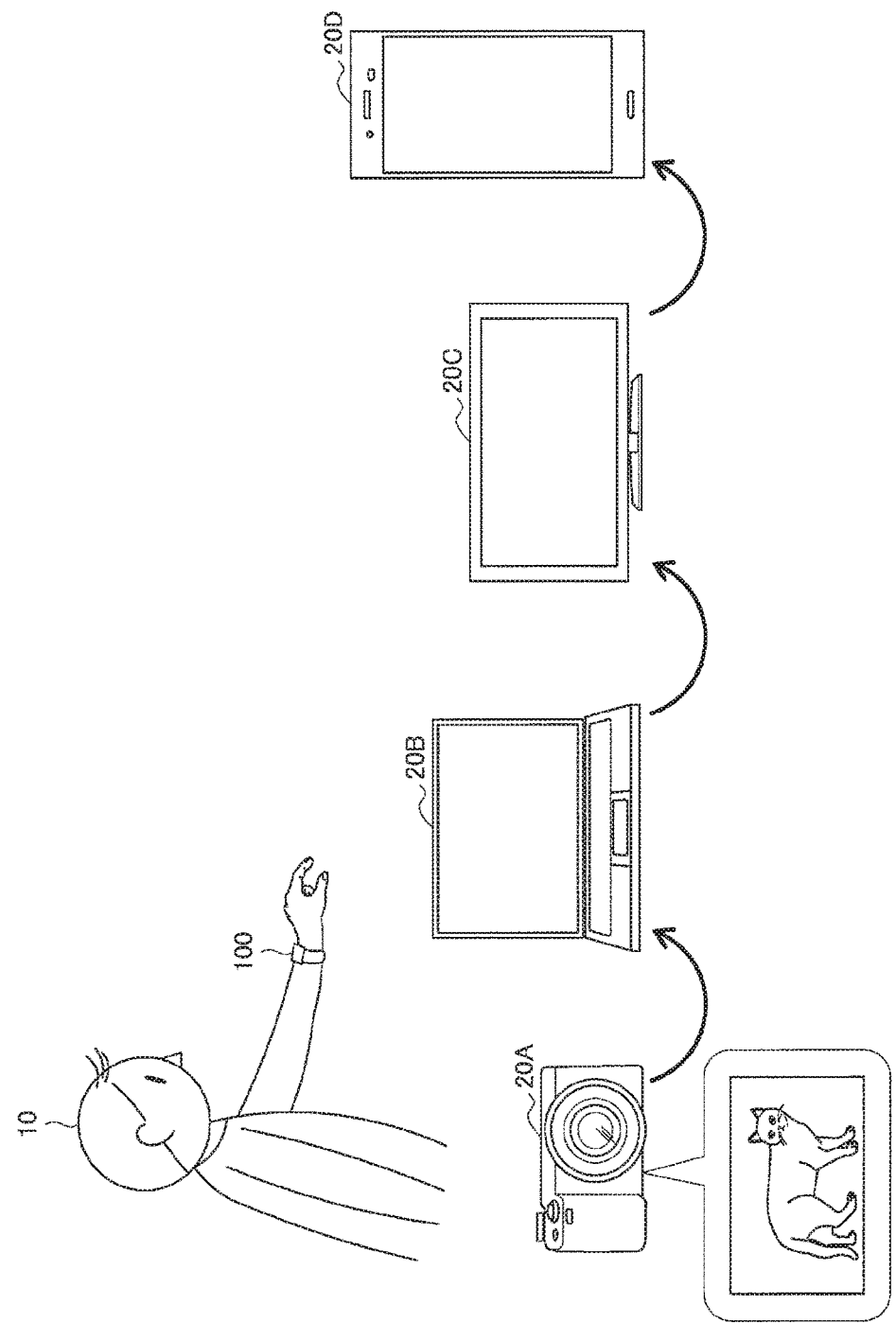

[FIG. 11]
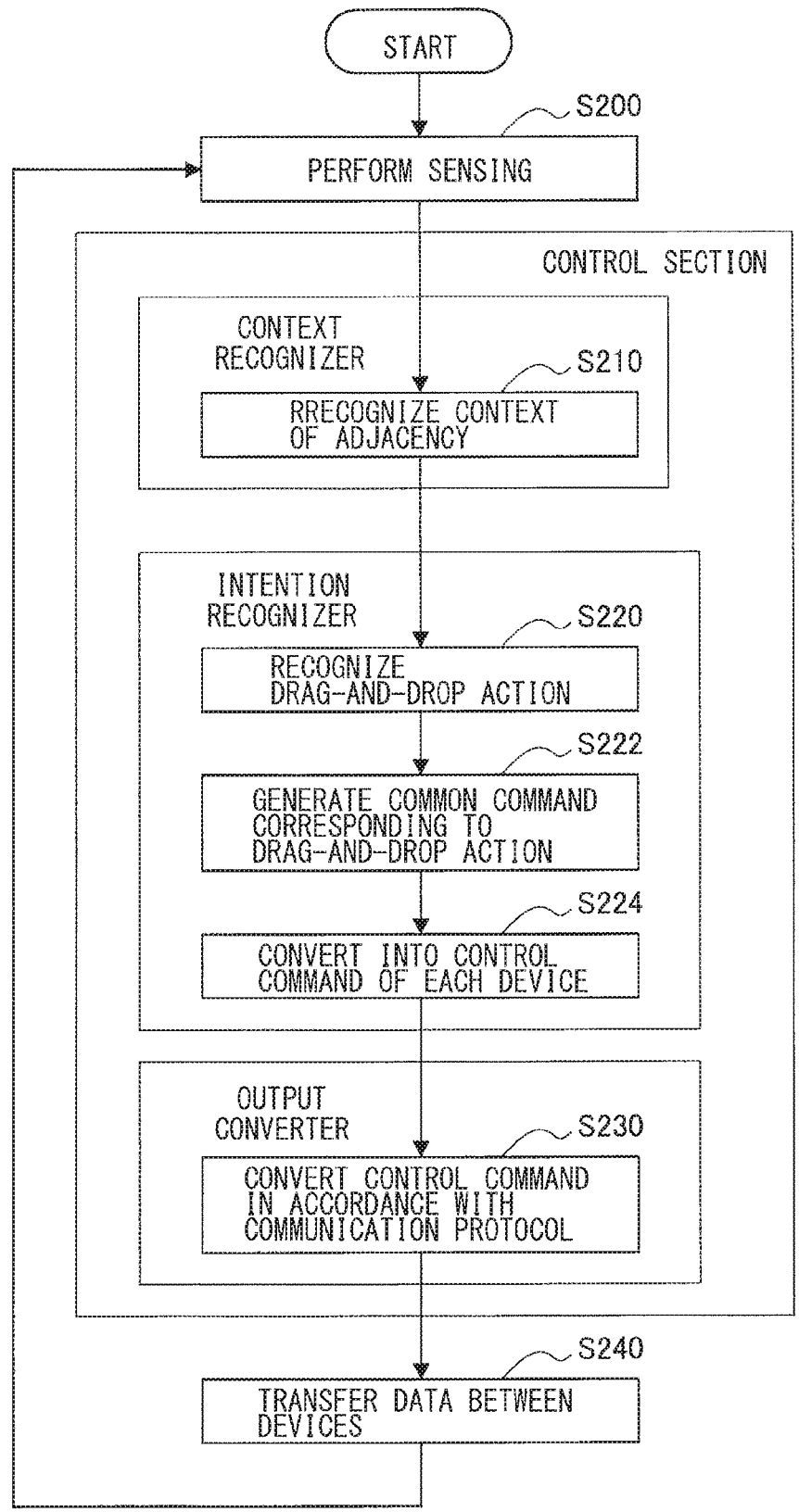

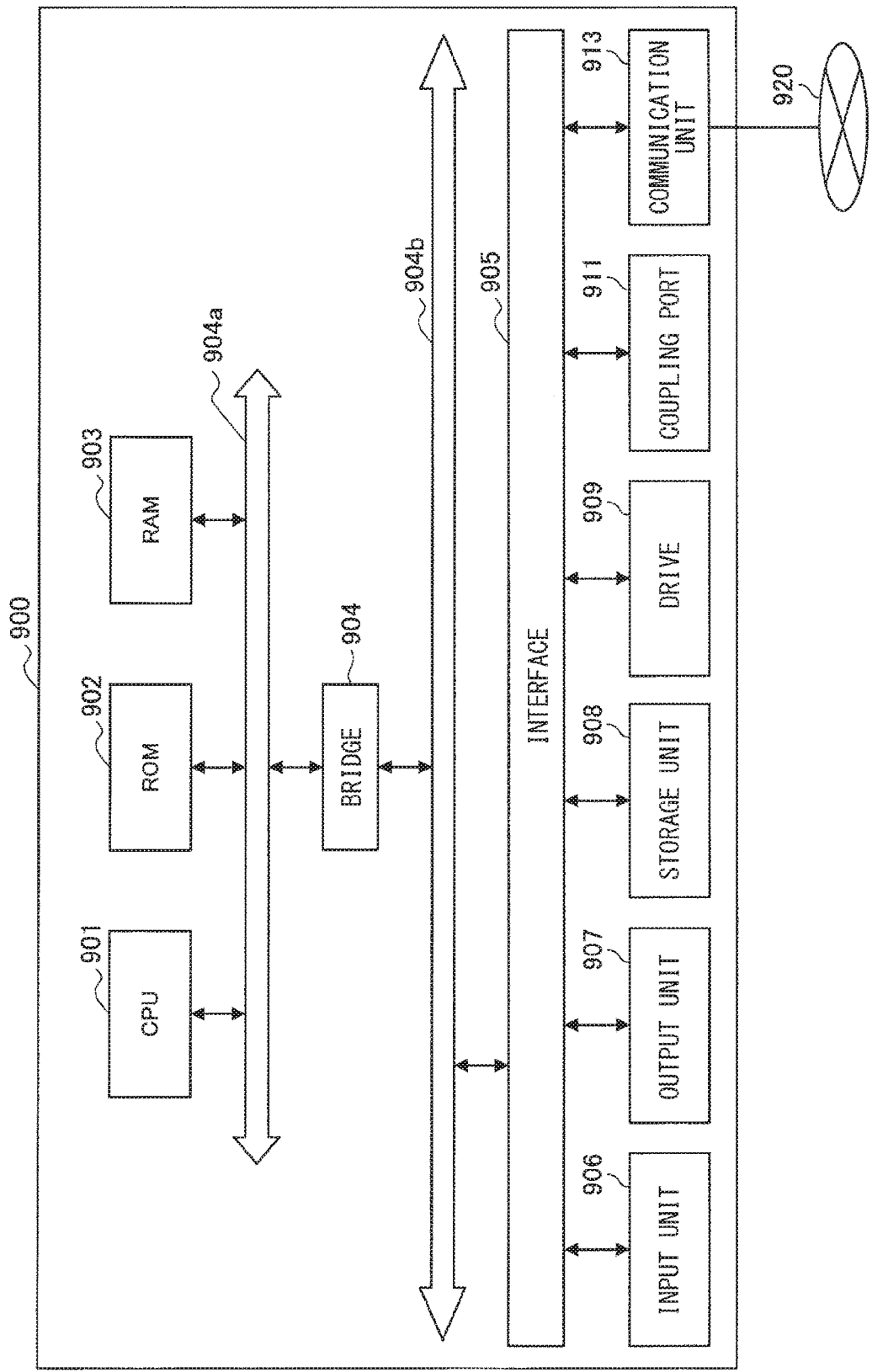
[FIG. 12]

INFORMATION PROCESSING DEVICE, INFORMATION PROCESSING METHOD, AND RECORDING MEDIUM

CROSS REFERENCE TO RELATED APPLICATIONS

This application is a U.S. National Phase of International Patent Application No. PCT/JP2018/016902 filed on Apr. 26, 2018, which claims priority benefit of Japanese Patent Application No. JP 2017-123953 filed in the Japan Patent Office on Jun. 26, 2017. Each of the above-referenced applications is hereby incorporated herein by reference in its entirety.

TECHNICAL FIELD

The present disclosure relates to an information processing device, an information processing method, and a recording medium.

BACKGROUND ART

When communicating with other people, organisms other than humans, devices such as robots, or the like, people communicate in methods corresponding to the respective contexts. For example, people communicate with people having the same native language by using the native language, and communicate with people having a different native language by using a common language such as English. In addition, when a person buys a new smartphone, the person learns how to operate the new smartphone. It is troublesome to use different communication methods in accordance with different contexts. This requests technology to be developed for reducing a communication load caused by a difference between contexts.

As an example, PTL 1 below discloses technology of generating and outputting synthesized speech obtained by translating input speech into another language by applying speech recognition processing, machine translation processing, and speech synthesis processing to the input speech.

CITATION LIST

Patent Literature

PTL 1: Japanese Unexamined Patent Application Publication No. 2001-117921

SUMMARY OF THE INVENTION

Problems to be Solved by the Invention

However, the technology described in PTL 1 above is merely to translate speech into another language. This may do predefined translations, but does not deliver any communication support corresponding to the contexts of both a user and a communication target.

Accordingly, the present disclosure provides a mechanism that is able to deliver communication support corresponding to the contexts of both a user and a communication target.

Means for Solving the Problems

According to the present disclosure, there is provided an information processing device including a control section that recognizes an intention of a first action subject on the basis of an action performed by the first action subject in a first context, generates information indicating the intention of the first action subject in a second context of the second action subject, and causes the information to be outputted to the second action subject. The first action subject is one of a user or a communication target of the user. The second action subject is another of the user or the communication target of the user.

In addition, according to the present disclosure, there is provided an information processing method including recognizing an intention of a first action subject on the basis of an action performed by the first action subject in a first context, generating information indicating the intention of the first action subject in a second context of the second action subject, and causing an output device to output the information to the second action subject. The first action subject is one of a user or a communication target of the user. The second action subject is another of the user or the communication target of the user.

In addition, according to the present disclosure, there is provided a recording medium having a program recorded thereon, the program causing a computer to function as a control section that recognizes an intention of a first action subject on the basis of an action performed by the first action subject in a first context, generates information indicating the intention of the first action subject in a second context of the second action subject, and causes the information to be outputted to the second action subject. The first action subject is one of a user or a communication target of the user. The second action subject is another of the user or the communication target of the user.

Effects of the Invention

As described above, according to the present disclosure there is provided a mechanism that is able to deliver communication support corresponding to the contexts of both a user and a communication target. It should be noted that the above-described effects are not necessarily limiting. Any of the effects indicated in this description or other effects that can be understood from this description may be exerted in addition to the above-described effects or in place of the above-described effects.

BRIEF DESCRIPTION OF DRAWING

FIG. 9 is a diagram for describing a fifth use case of the working example.

FIG. 10 is a diagram for describing an overview of a second working example.

FIG. 11 is a flowchart illustrating an example of a flow of communication support processing executed in the system according to the working example.

FIG. 12 is a block diagram illustrating an example of a hardware configuration of an information processing device according to the present embodiment.

MODES FOR CARRYING OUT THE INVENTION

Figure 1:
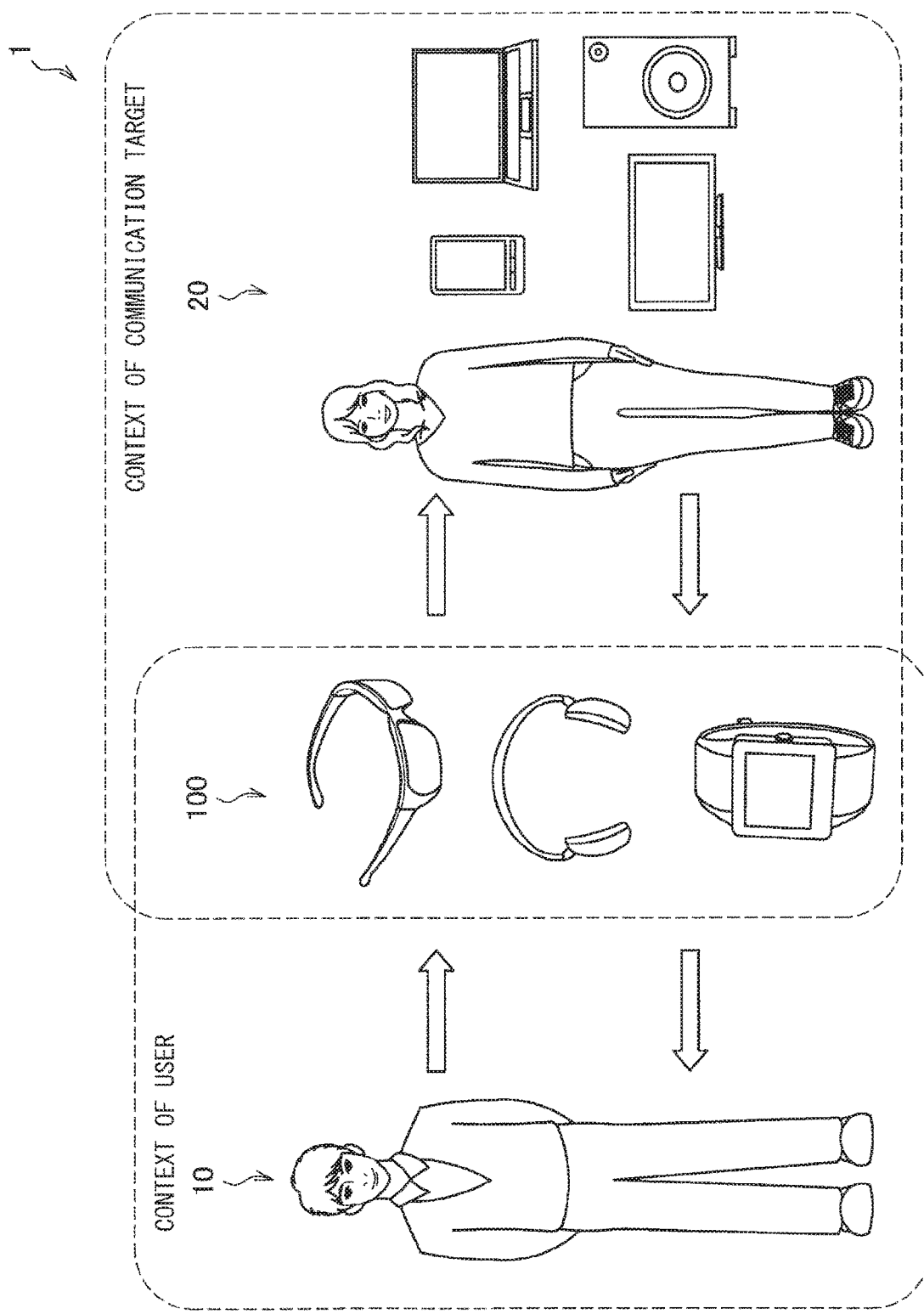
FIG. 1 is a diagram for describing an overview of a system according to an embodiment of the present disclosure.

The following describes a preferred embodiment of the present disclosure in detail with reference to the accompanying drawings. It should be noted that, in this description and the accompanying drawings, constituent elements that have substantially the same functional configuration are indicated by the same reference signs, and thus redundant description thereof is omitted.

Further, in this specification and the drawings, there are cases in which elements having substantially the same functional configuration are distinguished by adding different letters after the same reference numeral. For example, a plurality of elements having substantially the same functional configuration are distinguished as devices 100A, 100B, and 100C as necessary. However, in a case where it is not necessary to particularly distinguish a plurality of elements having substantially the same functional configuration, only the same reference numeral is attached. For example, in a case where it is not necessary to particularly distinguish the devices 100A, 100B, and 100C, they are referred to simply as devices 100.

It should be noted that the description is given in the following order.
1. Overview
2. Configuration Examples
2.1. Configuration Example of Device
2.2. Configuration Example of Another Device
3. Working Examples
3.1. First Working Example
3.1.1. First Use Case
3.1.2. Second Use Case
3.1.3. Third Use Case
3.1.4. Fourth Use Case
3.1.5. Fifth Use Case
3.1.6. Sixth Use Case
3.1.7. Seventh Use Case
3.2. Second Working Example
4. Example of Use Case
5. Hardware Configuration Example
6. Conclusion

1. OVERVIEW

First, the overview of a system 1 according to an embodiment of the present disclosure is described with reference to FIG. 1.

FIG. 1 is a diagram for describing the overview of the system 1 according to the present embodiment. As illustrated in FIG. 1, the system 1 includes devices 100 that support communication between a user 10 and a communication target 20 of the user 10.

The communication target 20 may be a human, (i.e., another user) or any kind of animal other than a human. The communication target 20 may be a device such as PC, a smartphone, or a tablet terminal. The communication target 20 may be a virtual object such as a game character or an AR (Augmented Reality) image.

Note that, in a case where it is not necessary to particularly distinguish the user 10 and another user who is the communication target 20 from each other, they are also collectively referred to as users. In addition, in a case where the communication target 20 is another user, the user 10 corresponding to the device 100 (e.g., wearing the device 100) may also be referred to as first user 10, and the other user 20 may also be referred to as second user 20.

In addition, of the user 10 and the communication target 20, the information sender is also referred to as first action subject, and the information receiver is also referred to as second action subject. Then, the context of the first action subject is also referred to as first context, and the context of the second action subject is also referred to as second context. For example, the first 10 is the first action subject, and the second user 20 is the second action subject in a remark made from the first user 10 to the second user 20. Meanwhile, the second 20 is the first action subject, and the first user 10 is the second action subject in a remark made from the second user 20 to the first user 10. In a case where it is not necessary to particularly distinguish the first action subject and the second action subject from each other, they may also be collectively referred to as action subjects.

The device 100 delivers communication support corresponding to the contexts of both the user 10 and the communication target 20. Specifically, the device 100 converts an action performed by the user 10 in the context of the user 10 into information having the equivalent meaning in the context of the communication target 20, and outputs the information to the communication target 20. This allows the user 10 and the communication target 20 to each have communication based only on the own context without making any effort by themselves to resolve a difference between the respective contexts. In other words, the user 10 and the communication target 20 are allowed to communicate with each other without being conscious of a difference between the respective contexts. This allows the user 10 to apply the same mental model to any of the communication targets 20. Note that the mental model is an image of people for things. For example, the mental model is an image regarding a way of communicating with another person or an operation method of a device.

For example, the first user 10 is allowed to converse with the second user 20 having a different native language by using the native language of the first user 10. The contents of speech of the first user 10 in the native language are converted by the device 100 into the native language of the second user 20, and the converted contents of the speech are outputted. The same applies to conversations in the opposite direction. This eliminates work such as checking a dictionary, and makes knowledge and conversation ability of other languages unnecessary. Furthermore, it is unnecessary to even recognize that the contexts are different.

The device 100 is, for example, a wearable device. The device 100 is worn by the user 10. The device 100 may be achieved as various wearable devices. For example, the device 100 may be a device of a glass-type, neckband-type, necklace-type, wristband-type, watch-type, belt-type, glove-type, ring-type, nail-type, shoe-type, clothing-type, or the like.

In a case where the device 100 is achieved as a wearable device, the device 100 is constantly worn by the user 10. This allows the user 10 to receive communication support without consciously operating the device 100. In addition, the device 100 may also reflect the internal state of the user 10. For example, the device 100 may synthesize and output joyful speech when the user 10 is in a joyful mood, and the device 100 may synthesize and output sad speech when the user 10 is in a sad mood. This achieves more advanced communication.

2. CONFIGURATION EXAMPLES

Figure 2:
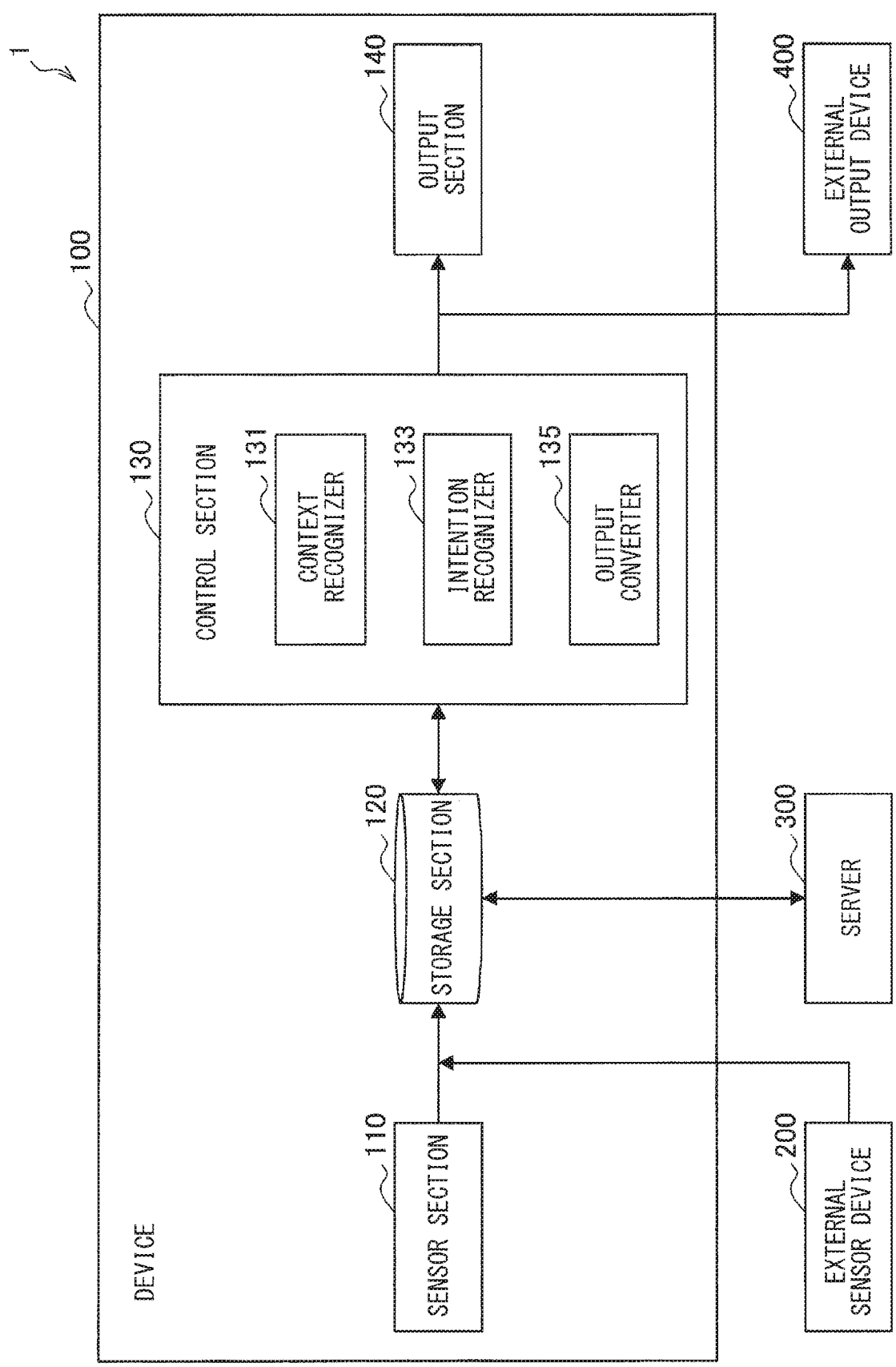
FIG. 2 is a block diagram illustrating an example of an overall configuration of the system according to the present embodiment.

FIG. 2 is a block diagram illustrating an example of the overall configuration of the system 1 according to the present embodiment. As illustrated in FIG. 2, the system 1 includes the device 100, an external sensor device 200, a server 300, and an external output device 400. The following describes a detailed configuration example of each device.

2.1. Configuration Example of Device

As illustrated in FIG. 2, the device 100 includes a sensor section 110, a storage section 120, a control section 130, and an output section 140.

(1) Sensor Section 110

The sensor section 110 has a function of sensing information regarding the first action subject (i.e., the user 10 or the communication target 20) or the surrounding environment. The sensor section 110 outputs sensing information obtained as a result of the sensing to the storage section 120.

Example of Sensor Unit

The sensor section 110 may include various sensor units. The following describes an example of the sensor units that may be included in the sensor section 110. The sensor section 110 includes at least any of the following sensor units. The sensor section 110 may include a plurality of sensor units of the same type, or may include a sensor unit other than the sensor units listed below.

For example, the sensor section 110 may include a microphone that senses sound information. The microphone may be a directional microphone.

For example, the sensor section 110 may include an image sensor that senses an image (still image or moving image). The image sensor may be a so-called digital camera including a lens system, a drive system that drives the lens system, and an imaging element that generates an imaging signal from imaging light obtained from the lens system. Alternatively, the image sensor may be achieved as a unit such as an infrared camera or stereo camera that senses other information such as temperature information or depth information along with the image.

For example, the sensor section 110 may include a distance measurement sensor that measures the distance to a distance measurement target. The distance measurement sensor may be achieved as a stereo camera, LiDAR (Light Detection and Ranging), a millimeter wave radar, or a laser Doppler sensor.

For example, the sensor section 110 may include a position sensor that senses positional information. The position sensor may be achieved as a GNSS (Global Navigation Satellite System) signal receiver that receives GNSS signals (single or dual frequency) from GNSS satellites. The position sensor may be achieved as a wireless communication unit, and measures the position, for example, on the basis of the radio wave intensity associated with communication with an access point (or base station). Alternatively, the position sensor may be achieved as an inertial sensor. For example, the positional information based on the GNSS signals is corrected in accordance with sensing information obtained by the inertial sensor, or the positional information is sensed by inertial navigation. In addition, the position sensor may be achieved as an image sensor. The positional information is sensed, for example, by SLAM (Simultaneous Localization and Mapping).

For example, the sensor section 110 may include an inertial sensor. The inertial sensor senses angular velocity and acceleration in, for example, three axes.

For example, the sensor section 110 may include a user input unit. The user input unit may be achieved as, for example, a touch sensor, a button, a slider, a wheel, or the like.

For example, the sensor section 110 may include a biological information sensor. The biological information sensor may be achieved as, for example, a body temperature sensor, a brain wave sensor, a blood pressure sensor, a myoelectric potential sensor, a perspiration sensor, or a heart rate sensor.

For example, the sensor section 110 may include an environmental sensor. The environmental sensor may be achieved as, for example, an air temperature sensor, an atmospheric pressure sensor, or a humidity sensor.

For example, the sensor section 110 may be achieved as a communication unit. The communication unit may be a wireless communication unit that is able to perform communication conforming to any wireless communication standard such as LTE (Long Term Evolution), Wi-Fi (registered trademark), Bluetooth (registered trademark), BLE (Bluetooth Low Energy (registered trademark)), or visible-light communication. Needless to say, the communication unit may also be a wired communication unit that is able to perform communication conforming to any communication standard such as wired LAN (Local Area Network).

(2) Storage Section 120

The storage section 120 has a function of temporarily or permanently storing data for an action by the device 100. The storage section 120 stores sensing information outputted from the sensor section 110, sensing information received from the external sensor device 200, and external accumulated information outputted from the server 300.

(3) Control Section 130

The control section 130 controls the overall action of the device 100, and provides various functions of the device 100. The control section 130 includes a context recognizer 131, an intention recognizer 133, and an output converter 135.

(3.1) Context Recognizer 131

The context recognizer 131 has a function of recognizing a context. Specifically, the context recognizer 131 recognizes the context of the action subject (i.e., the user 10 or the communication target 20) on the basis of information (e.g., sensing information) stored in the storage section 120.

The context is information that serves as the background of an action performed by the action subject. The following describes an example of the contexts.

The context may be information indicating an attribute. The information indicating the attributes of a user includes sex, a name, age, a birthday, a native language, a company, an address, a telephone number, the ID of a message application, a commuting route, and a workplace address. The information indicating the attributes of a device includes identification information such as a manufacturing number, a manufacturer, a type, a manufacturing period, an input/output interface, and the like. The information indicating attributes may be registered in advance by a user or may be recognized on the basis of the past contexts regarding places or activity.

The context may be information indicating a place. The information indicating the place of a user includes a country, a prefecture, a state, absolute coordinates, indoor coordinates, and a location class such as a company, a house, a supermarket, a train, or a hospital. The information indicating the attributes of a device includes absolute coordinates, indoor coordinates, and location classes. The information indicating places may be recognized on the basis of sensing information obtained by a position sensor. In this case, a GNSS receiver is basically used, and a wireless communication unit, an inertial sensor, an image sensor, and the like may be used in combination to recognize detailed coordinates or indoor coordinates.

The context may be information indicating an environment. The information indicating the environment of a user includes noise, air temperature, weather, illuminance, wind speed, humidity, altitude, population density, and the like. The information indicating the environment of a device includes what is similar to the information indicating the environment of a user. The information indicating environments may be recognized on the basis of sensing information obtained by a microphone, an air temperature sensor, and the like.

The context may be information indicating an adjacency relationship. The information indicating the adjacency relationship of a user includes information indicating the relationship with another person such as family, a friend, a lover, a boss, or a complete stranger, and information indicating an object such as a TV receiver, a house key, a coffee shop, or a taxi in the vicinity of the user. The information indicating an adjacency relationship may be recognized, for example, on the basis of a combination of radio wave intensity, sound matching, image matching, the context regarding places, and the context regarding environments.

The context may be information indicating activity. The information indicating the activity of a user includes being inactive, moving, resting, working, sleeping, eating, excreting, drinking, conversing, exercising, playing, studying, cleaning, reading, operating a smartphone, and the like. The information indicating activity may be recognized, for example, on the basis of a combination of sensing information obtained by an inertial sensor, an image sensor, or the like, the context regarding places, and the context regarding environments. Note that a plurality of pieces of information indicating the activity of a user may be recognized at the same time.

The context may be information indicating a transportation means. The information indicating transportation means of a user includes stopping, walking, a bicycle, an automobile, a train, a Shinkansen, a vessel, an airplane, and the like. The information indicating transportation means may be recognized on the basis of a combination of pieces of sensing information obtained by, for example, a GNSS receiver and an inertial sensor.

The context may be information indicating a preference. The information indicating the preferences of a user includes music, food, sports, colors, books, movies, ideas, types of girls/guys, and the like. The information indicating preferences may be registered in advance by a user or may be recognized on the basis of the past contexts regarding places, activity, or emotions.

The context may be information indicating a physical condition or a physical state. The information indicating the physical condition or physical state of a user includes body temperature, constipation, menstruation, favorable/poor conditions, affected sites, concentration/distraction, reassurance/anxiety, degree of arousal, and the like. The information indicating the state of a device includes operating time, remaining battery, temperature, and the like. The information indicating a physical condition or a physical state may be recognized by combining biological information such as body temperature, pulsation, electrocardiograms, or brain waves, facial expressions of a user sensed by an image sensor, and sensing information obtained by an inertial sensor.

The context may be information indicating an emotion. The information indicating emotions of a user includes a basic emotion and an applied emotion. The basic emotion includes pleasure, trust, anxiety, surprise, sadness, disgust, anger, and anticipation. The applied emotion includes optimism, love, obedience, awe, disappointment, self-blame, scorn, and aggressiveness. The information indicating emotions may be recognized by combining biological information, an image of a user sensed by an image sensor, sensing information obtained by an inertial sensor, the current and past contexts regarding environments, and the current and past contexts regarding activity.

Note that the contexts of preferences, physical conditions, physical states, or emotions may be collectively referred to as internal contexts.

(3.2) Intention Recognizer 133

Action Recognition

The intention recognizer 133 recognizes an action performed by the first action subject. Specifically, the intention recognizer 133 recognizes an action performed in the first context by the first action subject that is one of the user 10 or the communication target 20 of the user 10 on the basis of information stored in the storage section 120. The following describes an example of action recognition.

Speaking Action

The intention recognizer 133 recognizes a user's speaking action. For example, the intention recognizer 133 recognizes the contents (e.g., text information) of speech of a user.

In a case where there is a microphone disposed near the head of the user, the microphone is allowed for sensing under conditions close to the perception of the user. In a case where it is difficult to extract user speech only on the basis of sensing information from the microphone in a noisy environment or the like, the intention recognizer 133 performs speech separation by combining a result of image recognition of the movement of the mouth, the myoelectric potential regarding the movement of the mouth, and the like.

Gesture

The intention recognizer 133 recognizes a gesture of a user.

The intention recognizer 133 recognizes a gesture on the basis of sensing information obtained by a sensor unit corresponding to a gesture to be recognized. For example, the intention recognizer 133 recognizes a gesture on the basis of sensing information obtained by an image sensor disposed at a position where a gesture to be recognized is not hidden. For example, the intention recognizer 133 recognizes a gesture on the basis of sensing information obtained by an image sensor worn on a portion where a gesture to be recognized is performed. These kinds of recognition processing may be combined.

Touching Action

The intention recognizer 133 recognizes a user's touching action.

For example, the intention recognizer 133 recognizes an action of touching an object on the basis of sensing information obtained by an electrostatic touch sensor, in addition to information of the number of contact points and the pressure. In addition, the intention recognizer 133 recognizes a contacting action such as pressing or switching a physical switch on the basis of sensing information obtained by the physical switch. In addition, the intention recognizer 133 recognizes an action of contacting an object having no substance, such as a space, on the basis of sensing information obtained by an image sensor.

Other Actions

The intention recognizer 133 recognizes an action of a user other than the actions described above.

For example, the intention recognizer 133 recognizes a moving action. The intention recognizer 133 recognizes what a user has moved and how much the user has moved it, on the basis of sensing information obtained by an image sensor. For example, the intention recognizer 133 recognizes a watching action. The intention recognizer 133 recognizes actions regarding eye movements such as line of sight and blinking on the basis of sensing information obtained by an image sensor or a myoelectric potential sensor. For example, the intention recognizer 133 recognizes a straining action. The intention recognizer 133 recognizes the activity of the muscle on the basis of sensing information obtained by an image sensor or a myoelectric potential sensor.

Intention Recognition

The intention recognizer 133 recognizes the intention of the first action subject that is one of the user 10 or the communication target 20 of the user 10 on the basis of an action performed by the first action subject in the first context. The intention recognizer 133 then generates information indicating the intention of the first action subject in the second context of the second action subject that is the other of the user 10 or the communication target 20 of the user 10. For example, the intention recognizer 133 recognizes the intention of the user 10 on the basis of an action performed by the user 10 in the context of the user 10. The intention recognizer 133 then generates information indicating the intention of the user 10 in the context of the communication target 20. In addition, the intention recognizer 133 recognizes the intention of the communication target 20 on the basis of an action performed by the communication target 20 in the context of the communication target 20. The intention recognizer 133 then generates information indicating the intention of the communication target 20 in the context of the user 10. In this way, the intention recognizer 133 is able to generate information indicating the intention of the first action subject in accordance with the context of the second action subject More simply, the intention recognizer 133 converts an action performed by the first action subject into information having the equivalent meaning in the second context. The same action may have different meaning in a different context. Such conversion thus allows the first action subject to communicate without being conscious of a difference from the context of the second action subject. In addition, the second action subject is also provided with information conforming to the context of the second action subject. This allows the second action subject to communicate without being conscious of a difference from the context of the first action subject. In this way, it is possible to make communication smoother between the user 10 and the communication target 20.

The intention of the first action subject is the motivation for the first action subject to perform an action. For example, the intention of a user is information that the user consciously or unconsciously desires to transmit to another person. Specifically, the intention of a user is a message, (i.e., information including one or more consecutive words) and/or an emotion, etc. The intention of a user is recognized, for example, on the basis of the user's facial expression, complexion, line of sight, gesture, posture, speech, voice quality, tone, respiration, or distance to another person and the context of the user sensed by a sensor unit.

Device

For example, in a case where the communication target 20 is a device such as a computer including a user interface, the intention of the user 10 is an action that the user 10 desires the device 20 to perform. For example, even in a case where the operation method expected by the user 10 is different from the operation method of the device 20, the intention recognizer 133 is able to cause the second user 20 to execute an action that the user 10 has caused the device 20 perform.

(3.3) Output Converter 135

The output converter 135 has a function of converting information indicating the intention of the first action subject generated by the intention recognizer 133 into output information that is outputted to the second action subject. For example, the output converter 135 converts the information indicating the intention of the first action subject into output information including an image, speech, light, a tactile stimulus, or a combination thereof. The output information may be regarded as information indicating the intention of the first action subject.

The output converter 135 causes output information to be outputted to the second action subject. For example, the output converter 135 outputs output information to the output section 140, and causes the output section 140 to output the output information to the second action subject. In addition, for example, the output converter 135 outputs output information to the external output device 400, and causes the external output device 400 to output the output information to the second action subject.

The output converter 135 selects an output destination of output information from the output section 140 and the external output device 400. For example, the output converter 135 outputs output information of an image to the output section 140 if the output section 140 includes a display. The output converter 135 outputs output information of an image to the external sensor device 200 including a display if the output section 140 includes no display.

(4) Output Section 140

The output section 140 has a function of outputting output information to the second action subject (i.e., the user 10 or the communication target 20).

Example of Output Unit

The output section 140 may include various output units. The following describes an example of the output units that may be included in the output section 140. The output section 140 includes at least any of the following output units. The output section 140 may include a plurality of output units of the same type, or may include an output unit other than the output units listed below.

The output section 140 may include an image output unit. The image output unit may be achieved by, for example, a display, a projector, or electronic paper.

The output section 140 may include an audio output unit. The audio output unit may be achieved by, for example, a speaker or an earphone. The speaker may be a typical speaker such as a dynamic type, or may be a bone-conductive speaker or a directional speaker.

The output section 140 may include a tactile output unit. The tactile output unit may be achieved by, for example, a heater, an actuator, or an electrical stimulus output unit.

The output section 140 may include a light output unit. The light output unit may be achieved by, for example, an LED (light emitting diode) lamp.

The output section 140 may include a fragrance output unit. The fragrance output unit includes, for example, a vibrator, and vaporizes a liquid such as aroma oil including a fragrance component by the vibration.

Specific Examples

The following describes specific examples of the output of the output information made by the output section 140.

The output section 140 may output visual output information. For example, LED is turned on, an image is displayed by a display, or an image is projected onto an object or a person by a projector. In a case where the device 100 is achieved as a glass-type device, the output information is displayed on a see-through display in an AR manner.

Visual output information may be outputted in a case where the device 100 is, for example, a device of the glass-type, neckband-type, wristband-type, or watch-type. For example, a moving image of a sign language gesture translated from speech is displayed in an AR manner for the first user 10 wearing the glass-type device 100 and using sign language. For example, for the first user 10 wearing the glass-type device 100, supplemental information including a description regarding information (e.g., a keyword) that is not known by the first user 10 is displayed in an AR manner. For example, when the first user 10 performs an action (drag-and-drop action) of pinching an image displayed on PC or a diagram described in a notebook and releasing the image or the diagram on the wall, the image or the diagram is projected onto the wall.

The output section 140 may output aural output information. For example, speech is outputted from a speaker. The device 100 may switch speakers for outputs in accordance with the context of environments. For example, the device 100 makes an output from a noise cancellation speaker or a bone-conductive speaker in a noisy environment, and makes an output from a directional speaker in a quiet environment.

Auditory output information may be outputted in a case where the device 100 is, for example, a device of the glass-type, neckband-type, necklace-type, earring-type, wristband-type, glove-type, or ring-type.

The output section 140 may output tactile output information. For example, tactile output information is outputted by the vibration of an actuator. It is possible to express various kinds of information by variations in vibration pattern, intensity, or vibrating position. In addition, temperature information may be outputted by using a thermoelectric element.

The tactile output information may be outputted in a case where the device 100 is, for example, a device of the glass-type, neckband-type, wristband-type, watch-type, glove-type, ring-type, nail-type, or clothing-type. For example, the movement of an actuator outputs tactile output information to the first user 10 wearing the glove-type or clothing-type device 100. The movement of the actuator may physically change the shape of the surface of the first user 10 to output tactile output information. Typical examples include the output of Braille.

The output position of the tactile output information may change in accordance with the context. For example, the device 100 controls the output position to cause Braille to be outputted on a surface that is easy for the first user 10 to read, on the basis of the context regarding activity or the temperature of the surface of the device 100 (e.g., whether or not it is in contact with the body surface).

The output section 140 may output olfactory output information. For example, the device 100 causes a fragrance to be outputted that prevents an emotion of the first user 10 from running high, in accordance with the context regarding an emotion.

Olfactory output information may be outputted in a case where the device 100 is, for example, a device of the neckband-type, wristband-type, or watch-type.

2.2. Configuration Example of Another Device

The following describes configuration examples of the external sensor device 200, the server 300, and the external output device 400.

(1) External Sensor Device 200

The external sensor device 200 has a function of sensing information regarding the first action subject (i.e., the first user 10 or the communication target 20) or the surrounding environment. The external sensor device 200 performs wired communication or wireless communication with the device 100, and transmits sensing information obtained as a result of sensing to the device 100.

The external sensor device 200 may perform sensing on the basis of the control performed by the device 100.

The external sensor device 200 may include a sensor unit similar to the sensor section 110.

Note that, in a case where it is not necessary to particularly distinguish a sensor unit included in the sensor section 110 and a sensor unit included in the external sensor device 200 from each other, they are collectively referred to as sensor units below.

(2) Server 300

The server 300 has a function of storing external accumulated information. The server 300 functions as an external storage device of the device 100, and transmits the stored information to the device 100 or stores information received from the device 100. The following describes an example of the external accumulated information.

The server 300 stores data inputted in advance. The data inputted in advance is information inputted by the first user 10, and includes, for example, the context or the like of attributes.

The server 300 stores public data. The public data includes, for example, map information, weather information, or the like.

The server 300 stores the past sensing information of the first user 10, and information indicating the past context of the first user 10.

The server 300 stores the past sensing information of the second user 20, and information indicating the past context of the second user 20.

(3) External Output Device 400

The external output device 400 has a function of outputting output information to the second action subject (i.e., the first user 10 or the communication target 20). The external output device 400 performs wired communication or wireless communication with the device 100, and outputs output information received from the device 100.

The external output device 400 may make an output on the basis of the control performed by the device 100.

The external output device 400 may include an output unit similar to the output section 140.

The external output device 400 may be achieved as various devices. For example, the external output device 400 may be achieved as PC, a TV receiver, a lighting, a smartphone, an audio device, or another device. In addition, the external sensor device 200 and the external output device 400 may be integrally formed.

Note that, in a case where it is not necessary to particularly distinguish an output unit included in the output section 140 and an output unit included in the external output device 400 from each other, they are collectively referred to as output units below.

3. WORKING EXAMPLES

The following describes specific working examples with reference to FIGS. 3 to 11.

3.1. First Working Example

The present working example relates to communication between humans. The following describes the overview of the present working example with reference to FIG. 3.

Figure 3:
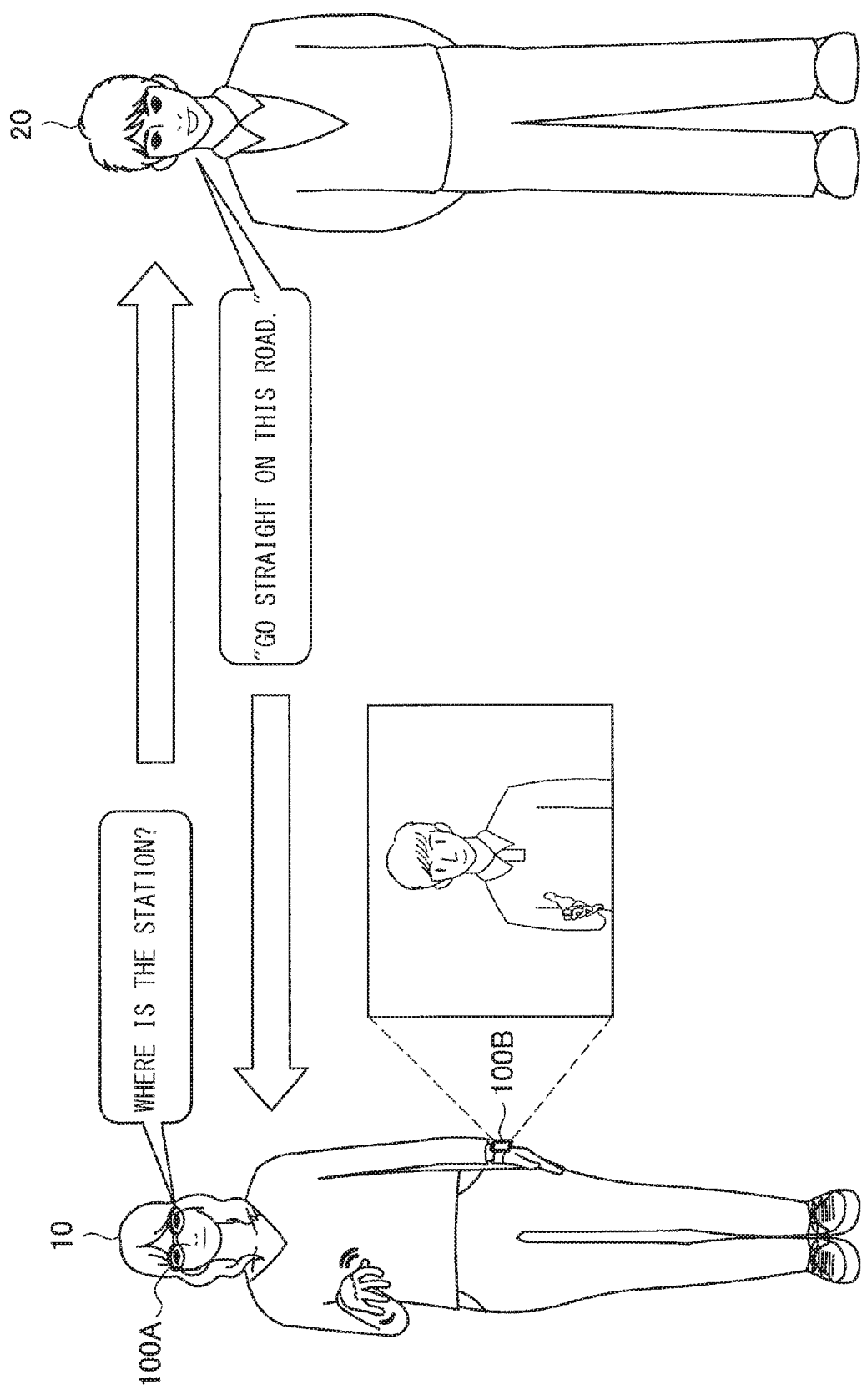
FIG. 3 is a diagram for describing an overview of a first working example.

FIG. 3 is a diagram for describing the overview of the first working example. As illustrated in FIG. 3, the first user 10 is wearing a glass-type device 100A and a watch-type device 100B as the devices 100. The first user 10 is a sign language user and the second user 20 is a spoken language user. When the first user 10 asks where the station is in sign language, the device 100 converts the sign language into the speech "Where is the station?" and outputs the speech from a speaker. When the second user 20 speaks "Go straight on this road" as a response, the device 100B converts the speech into sign language, and outputs, on a display, an image of an avatar expressing it in sign language. Watching the sign language of the avatar allows the first user 10 to recognize where the station is. In this way, natural communication is achieved which does not make prominent a difference between the contexts of the first user 10 and the second user 20 or a difference between a sign language user and a spoken language user.

In the present working example, the communication target 20 is a human. For example, different languages are used in the first context and the second context. The languages used include English, Japanese, and the like in addition to sign language and spoken language.

The device 100 converts a first message expressed by using a first language into a second message expressed by using a second language, thereby generating information indicating the intention of the first action subject. For example, in a case where the first action subject (e.g., the second user 20) is a spoken language (i.e., speaking voice) user and the second action subject (e.g., the first user 10) is a sign language user, the device 100 converts a message expressed by the first action subject using the spoken language into a moving image of an avatar performing the sign language gesture corresponding to the message. Watching the avatar allows the second action subject to recognize the message outputted by the first action subject. Alternatively, in a case where the first action subject is a spoken language user and the second action subject is a sign language user, the device 100 may convert a message expressed by the first action subject using the spoken language into a moving image of a hand performing the sign language gesture corresponding to the message. The gesture is superimposed on the first action subject displayed on a transmissive display, and displayed in an AR manner. Watching the gesture performed by a hand, superimposed on the first action subject displayed on the transmissive display, and displayed in an AR manner allows the second action subject to recognize the message outputted by the first action subject. This allows the second action subject to recognize a message from the first action subject as if the first action subject actually made a remark in sign language. In any case, the message expressed by the first action subject using spoken language is expressed in sign language and provided to the second action subject. This allows the second action subject to easily communicate with the first action subject.

Further, the device 100 may convert the meta-information of the first message to the meta-information of the second message. This causes the meta-information expressed by the first action subject, for example, using spoken language to be expressed in sign language and provided to the second action subject. This allows the second action subject to easily communicate with the first action subject. This allows an emotion or the like of the first action subject to be transmitted to the second action subject. An emotion and the like are difficult to transmit only by a message (e.g., text information).

Here, the messages in spoken language are text information. The meta-information in spoken language is information indicating speaking speed, voice volume, or the like.

In addition, the messages in sign language are information including consecutive words (gestures corresponding to the words) in sign language. The meta-information in sign language is, for example, information indicating gesture speed, gesture size, or the like.

The device 100 may perform the conversion for each word. In this case, the first message is converted word by word and outputted as the second message. This makes it possible to reduce, for example, the time lag from a remark of the first action subject in sign language to the output of speech to the second action subject. A delay caused by a grammar difference or the like may decrease the tempo of conversations between different languages. In such a case, it is possible to maintain the tempo of conversations by performing conversion for each word. Such an operation mode may also be referred to as low delay mode.

Note that the "remark" in the present specification refers to a concept including both an expression made by a sign language gesture and an expression made by speech.

Figure 4:
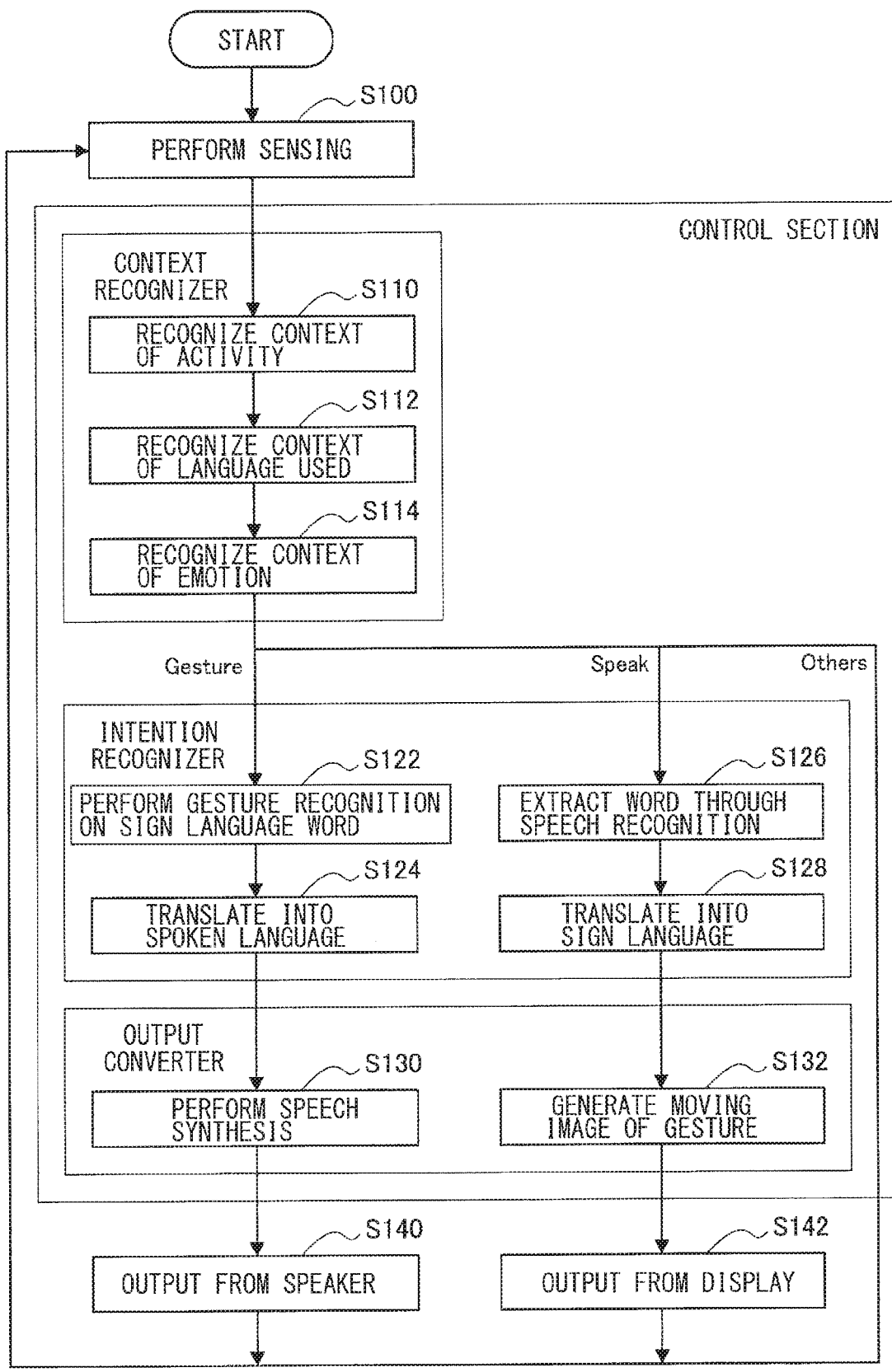
FIG. 4 is a flowchart illustrating an example of a flow of communication support processing executed in the system according to the working example.

Next, the detailed flow of processing in the example illustrated in FIG. 3 is described with reference to FIG. 4. Here, the flow of processing regarding communication between a spoken language user and a sign language user is described as an example. FIG. 4 is a flowchart illustrating an example of the flow of communication support processing executed in the system 1 according to the present working example.

Sensing

As illustrated in FIG. 4, first, the device 100 (i.e., the sensor section 110) performs sensing (step S100).

For example, the glass-type device 100A senses an image and speech with a camera and a microphone. This is to measure the movement (i.e., sign language) of a hand and speech (i.e., speaking voice) of a first user 10A and a second user 20B under conditions close to the perception of humans. The watch-type device 100B senses the movement of a hand with an acceleration sensor and an angular velocity sensor. This makes it possible to compensate, with sensor fusion, for the problem that a hand of the first user 10 is not sensed by the glass-type device 100A alone because the hand is hidden due to the limited angle of view of the camera or by the body of the first user 10A. In addition, the watch-type device 100B may perform sensing with a myoelectric potential sensor and a distance measurement sensor. In this case, the accuracy of recognizing the movement of a hand of the first user 10A is improved.

Note that sensing may also be performed by the external sensor device 200.

Recognition of Context

The device 100 (i.e., the context recognizer 131) then recognizes a context.

Specifically, the device 100 first recognizes the context of the activity of a user (step S110). For example, the device 100 recognizes the context of activity by classifying the activity of a user into the three classes of gesturing, speaking, and the others on the basis of sensing information obtained by a camera or a microphone.

The device 100 then recognizes the context of the language used by the user (step S112). The language used by the first user 10 may be registered in advance. The language used by the second user 20 is recognized, for example, on the basis of the country (corresponding to the native language) or the place (corresponding to the dialect) indicated by positional information, or the speech or the movement of a hand of the second user 20. The first user 10A is also able to manually set the language used by the second user 20B. In this way, the device 100 recognizes the contexts (attribute contexts) of languages used.

Next, the device 100 recognizes the context of the emotion of the user (step S114). For example, the device 100 recognizes an emotion of a user on the basis of a linguistic feature, biological information, a feature of a facial expression, and the like indicated by a gesture or speech. The linguistic feature includes gesture size and speed, and speaking intensity, speed, and pitch. The biological information includes the heart rate and perspiration of the first user 10A obtained by a biological information sensor, and the temperature of the body surface of the second user 20 obtained by an infrared camera. The feature of a facial expression is obtained by performing image recognition on a face image. By combining these pieces of information, the device 100 recognizes the context of emotions such as pleasure, anger, or sadness.

Conversion

After the above-described recognition of the contexts, the device 100 (i.e., the intention recognizer 133) converts information indicating the intention of the first action subject. Specifically, the device 100 generates information indicating the intention of the first action subject in the second context of the second action subject.

The device 100 converts (i.e., translates) the sign language of the first user 10 from sign language to spoken language. Specifically, first, the device 100 performs gesture recognition for each sign language word (step S120). The device 100 then does a translation into spoken language on the basis of the recognized sign language word (step S122). Sign language includes consecutive sign language words, and does not include information indicating the relationship between words other than the order of words. Therefore, when doing a translation into spoken language, the device 100 performs natural language processing to supplement a postpositional article or an auxiliary verb as appropriate between words. The device 100 reflects, in text information, an idiomatic expression including a combination of words characteristic of sign language. The device 100 may reflect the tone conforming to the context of the first user 10 in the text information or generate meta-information on the basis of the attribute context, emotion context, gesture speed and size, and the like of the first user 10.

The device 100 converts (i.e., translates) the speech of the second user 20 from spoken language to sign language. Specifically, first, the device 100 performs speech recognition for each word (step S124). The device 100 then does a translation into sign language on the basis of the recognized word (step S126). Specifically, the device 100 translates each of the words obtained by speech recognition into the corresponding sign language word, and arranges the sign language words in order that allows the translation in sign language to express similar meaning in spoken language. The device 100 may generate meta-information on the basis the attribute context, emotion context, speaking speed, voice volume, and the like of the second user 20.

Output Conversion

After the conversion processing described above, the device 100 (i.e., the output converter 135) converts information indicating the intention of the first action subject into output information.

For the sign language of the first user 10, the device 100 performs speech synthesis to generate speech indicating the spoken language converted from the sign language (step S130). For example, the device 100 performs speech synthesis by Text to Speech technology. In this case, on the basis of meta-information, the device 100 generates the speech that has the voice corresponds to the age, sex, and emotion of the first user 10, the speed corresponding to the gesture speed, and the voice volume corresponding to the gesture size. Such processing makes it possible to generate natural speech as if the first user 10 were speaking in spoken language.

For the speech of the second user 20, the device 100 generates a moving image of the gesture indicating the sign language converted from the spoken language (step S132). For example, the device 100 generates a CG (Computer Graphic) moving image of an avatar performing a gesture indicating the sign language. In this case, the device 100 generates an avatar having the age and sex of the second user 20 reflected therein, and causes the avatar to perform a gesture with the facial expression corresponding to the emotion of a spoken language user at the gesture speed corresponding to the speaking speed in the gesture size corresponding to the voice volume. Such processing makes it possible to generate a natural moving image as if the second user 20 were speaking in sign language.

Output

After the generation processing described above, the device 100 (i.e., the output section 140) outputs output information to the second action subject.

For the sign language of the first user 10, the device 100 outputs the generated speech from a speaker. For example, in a case where speech is outputted from a speaker of the glass-type device 100A, the speech is outputted from the area near the head of the first user 10. This makes it possible to give the second user 20 an impression as if the first user 10 were speaking. The device 100 may output speech, and concurrently display feedback information such as a CG image or text information indicating the recognized sign language. Such feedback allows the first user 10 to determine whether or not an output is intentionally made. This feedback may be performed by AR display by the glass-type device 100A, or may be performed by display by the watch-type device 100B.

For the speech of the second user 20, the device 100 outputs the generated moving image from a display. For example, a moving image is displayed by the glass-type device 100A in an AR manner, thereby allowing the first user 10 to feel as if the second user 20 in front of the first user 10 were speaking in sign language, and naturally interact with the second user 20. Note that, in a case where the second user 20 is also wearing the other device 100, feedback information may be outputted to the second user 20.

Note that information may also be outputted by the external output device 400.

After the information is outputted, the processing returns to step S100 again.

The following describes an example of a use case of the present working example.

<3.1.1. First Use Case>

Figure 5:
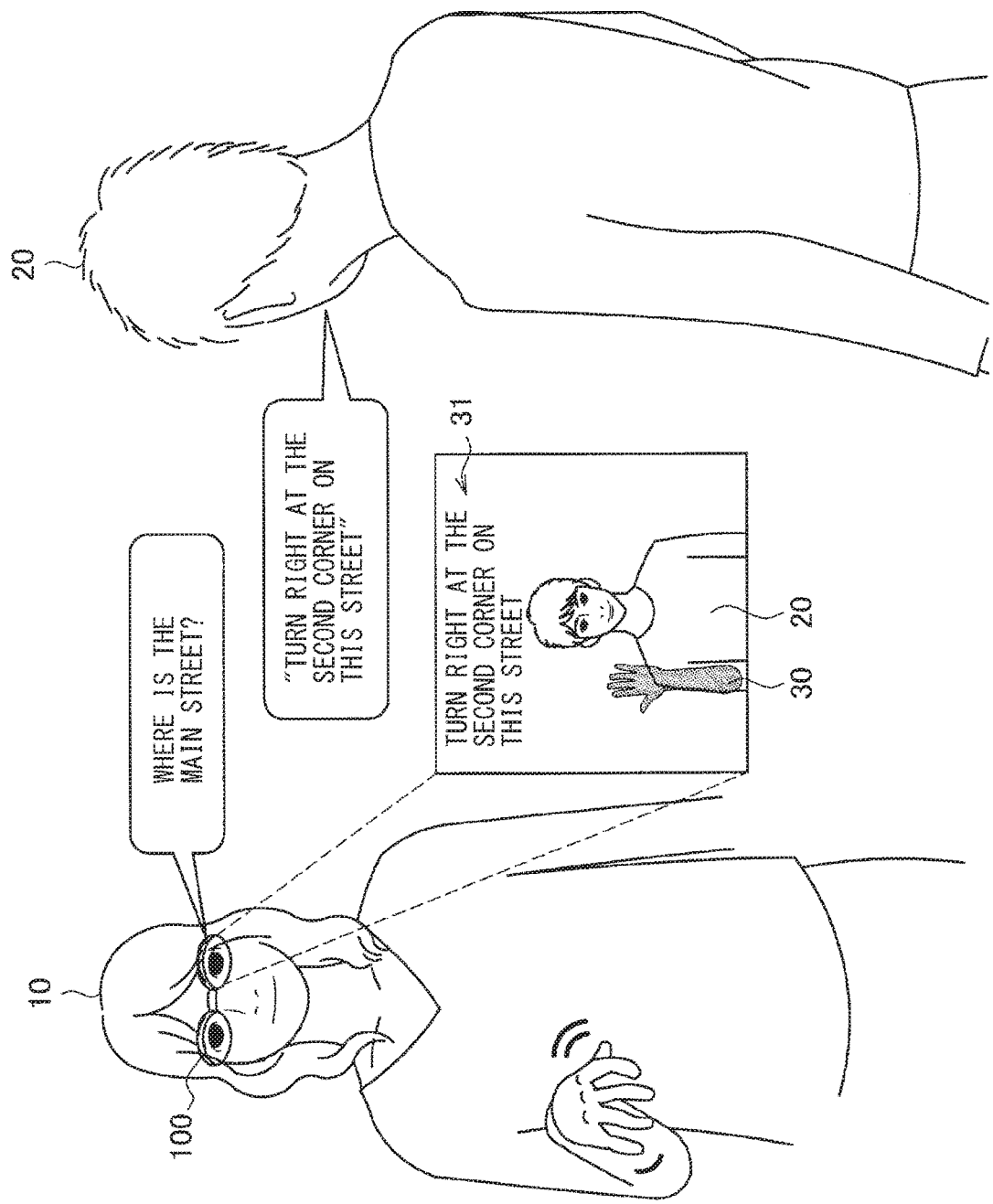
FIG. 5 is a diagram for describing a first use case of the working example.

FIG. 5 is a diagram for describing a first use case of the first working example. As illustrated in FIG. 5, the first user 10 is wearing the glass-type device 100. It is assumed that the first user 10 is a hearing-impaired person and a sign language user, and is a young woman. It is assumed that the second user 20 is an able-bodied person using spoken language, and is a young man. Then, it is assumed that the first user 10 gets lost and upset to ask the second user 20 for directions.

The first user 10 performs a sign language gesture asking the second user 20 for directions. Being upset and confused makes the sign language quick. Then, the device 100 outputs the speech "Where is the main street?" in the voice of a young woman. This speech is quickly reproduced in the casual tone "Where is?" and a slightly cracked voice. Such conversion based on meta-information causes the upset and confused emotions of the first user 10 to be reflected in the tone, voice quality, and speed.

The second user 20 recognizes that the second user 20 is asked for directions, and the first user 10 is upset and confused, on the basis of the speech outputted from the device 100. Then, the second user 20 briefly speaks, to the first user 10, "Turn right at the second corner on this street." The device 100 then performs speech recognition in real time, and superimposes and displays, in an AR manner, an arm 30 performing the corresponding sign language gesture on the second user 20 displayed on the see-through display. This allows the first user 10 to know a route from the second user 20. In a case where the second user 20 emphasizes a word such as "second" or "right," for example, by unconsciously speaking louder, the device 100 reflects the meta-information in the degree or speed of swinging an arm for the sign language gesture. In addition, the device 100 may display, in an AR manner, text information 31 obtained as a result of the speech recognition.

In this way, the first user 10 is able to know the route to the destination. The first user 10 is able to communicate without being conscious of a difference between the contexts, and begin communication with the second user 20 having a different context with no hesitation.

<3.1.2. Second Use Case>

Figure 6:
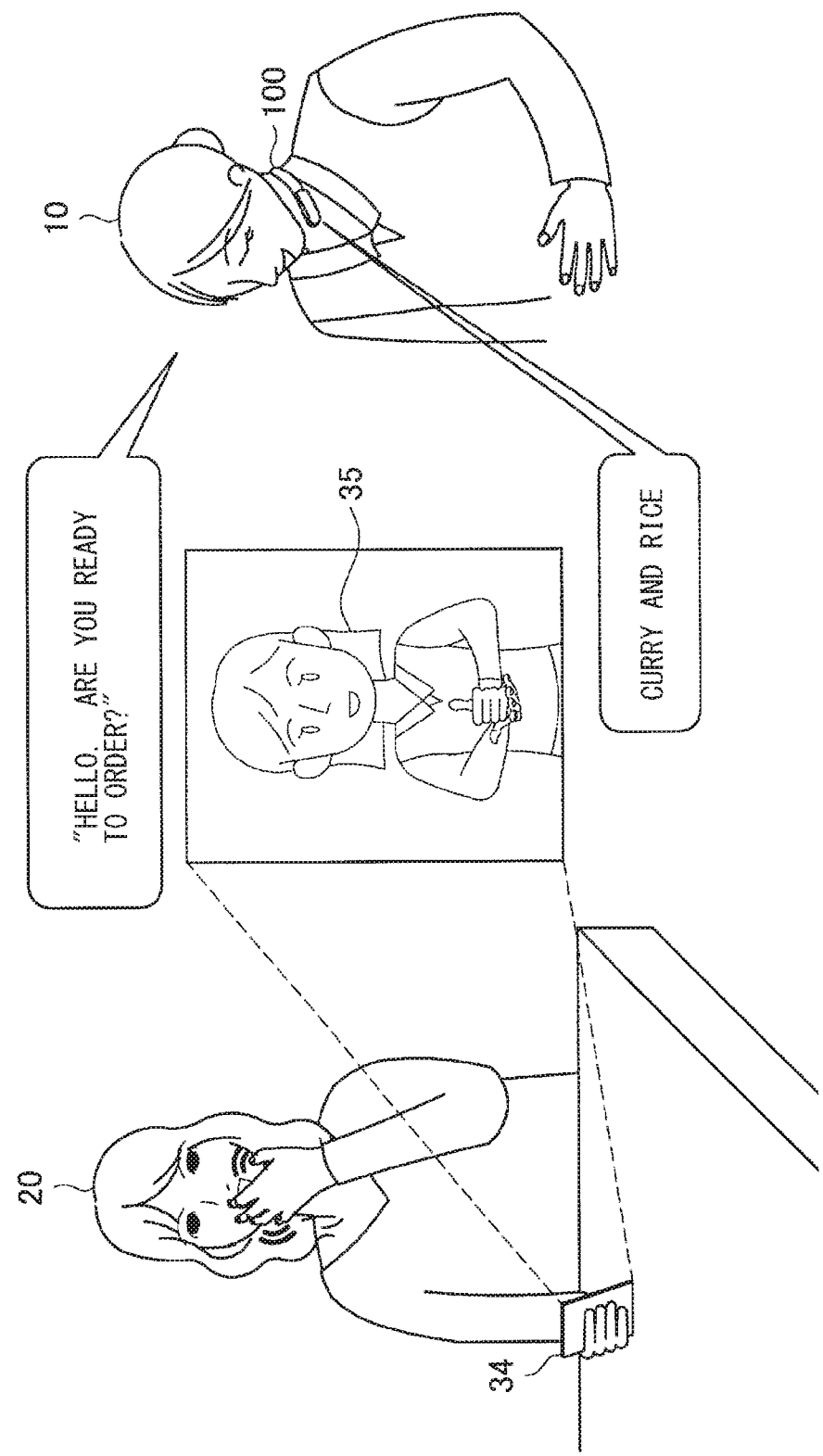
FIG. 6 is a diagram for describing a second use case of the working example.

FIG. 6 is a diagram for describing a second use case of the first working example. As illustrated in FIG. 6, the first user 10 is wearing the neckband-type device 100, and the second user 20 is operating a smartphone 34. The smartphone 34 is an example of the external output device 400. Then, it is assumed that the first user 10 is an employee of a restaurant, and the second user 20 is a customer visiting the restaurant. It is assumed that the first user 10 is an able-bodied person using spoken language, and is a woman. It is assumed that the second user 20 is a hearing-impaired person and a sign language user, and is a woman.

The first user 10 speaks "Hello. Are you ready to order?" and is about to take an order from the second user 20 sitting at the table. The second user 20 is a sign language user, and the device 100 thus performs speech recognition in real time and causes a moving image of a waitress avatar 35 performing the sign language gesture meaning "Hello. Are you ready to order?" to be outputted to the smartphone terminal 34. Note that the second user 20 may cause the smartphone 34 to function as the external output device 400 of the device 100 by bringing a dedicated application into operation on the smartphone 34. In a case where the first user 10 is serving politely, the waitress avatar 35 performs the sign language gesture at low speed with a mild facial expression. Such conversion based on meta-information allows the second user 20 to recognize that the second user 20 is politely served by the first user 10.

When the second user 20 makes an order with a sign language gesture, speech for an order is reproduced from the device 100 in the voice of a woman. In this case, a word (e.g., the name of a dish to be ordered, curry and rice) that is expressed by the second user 20 unconsciously swinging an arm greatly is reproduced at high volume. This allows the first user 10 to recognize an order from the second user 20.

It is assumed that the food and drink are provided late afterwards, the first user 10 apologizes, and the second user 20 pleasantly forgives and speaks "It's okay. I have some time" in sign language. The device 100 reads the emotion of the second user 20 and outputs the bright and soft speech "It's okay. I have some time." This allows the first user 10 to recognize that the second user 20 is not angry, and be relieved.

In this way, the second user 20 is able to easily perform interactions such as ordering and paying in the restaurant without using body movement or conversing in writing. This allows the second user 20 to go to the restaurant without feeling stressed, and allows QOL (quality of life) to be improved.

<3.1.3. Third Use Case>

Figure 7:
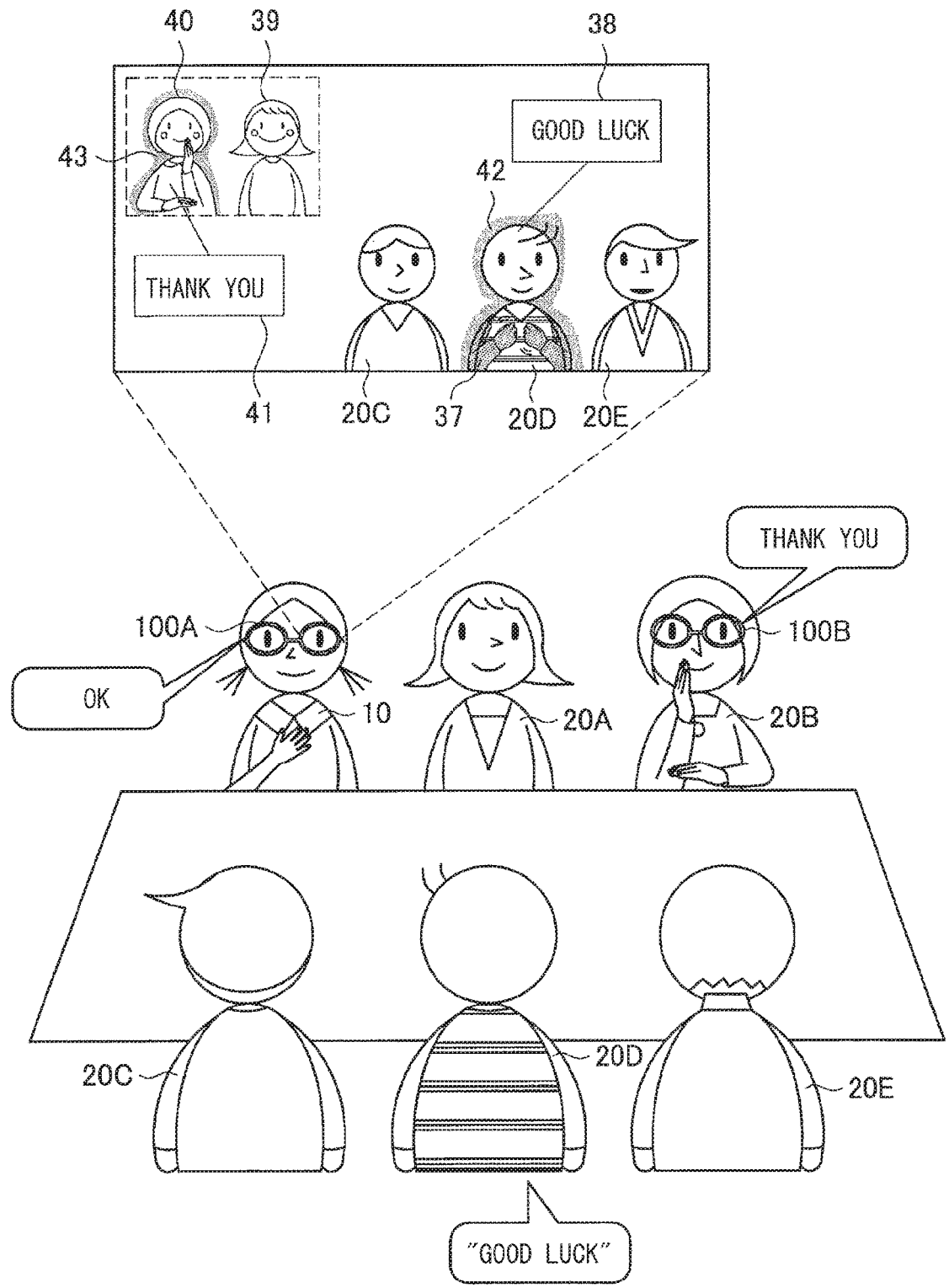
FIG. 7 is a diagram for describing a third use case of the working example.

FIG. 7 is a diagram for describing a third use case of the first working example. As illustrated in FIG. 7, the first user 10 is wearing the glass-type device 100A, the second user 20B is also wearing the glass-type device 100B, and the remaining users including second users 20A and 20C to 20E are not wearing the devices 100. The wearer of the device 100B is the first user for the device 100B, but the second user 20 for the device 100A. It is assumed that the first user 10 and the second user 20B are hearing-impaired persons and sign language users, and the second users 20A and 20C to 20E are able-bodied persons using spoken language. In addition, it is assumed that the first user 10 and the second users 20A and 20B are female, the second users 20C to 20E are male, they are all eating together.

When the first user 10 speaks in sign language, the speech corresponding to the sign language gesture is outputted from the device 100A in the voice of a woman. Similarly, when the second user 20B speaks in sign language, the speech corresponding to the sign language gesture is outputted from the device 100B in the voice of a woman. Here, the devices 100A and 100B perform speech synthesis by using sound sources of the voice quality specific to the respective users. This allows the other users to recognize which of the first user 10 and the second user 20B has spoken.

In a case where a person other than the wearers makes a remark, the sign language gesture is displayed on the see-through displays of the device 100A and the device 100B in an AR manner. For example, in a case where the second user 20D makes a remark, an arm 37 performing the sign language gesture corresponding to the contents of the remark is superimposed and displayed in an AR manner on the second user 20D displayed on the see-through display of the device 100A. In addition, the device 100 may also display text information 38 corresponding to the contents of the remark of the second user 20D in an AR manner. Here, the see-through display of the device 100A displays avatars 39 and 40 in an AR manner at the end in the direction in which the second users 20A and 20B are located for the first user 10. The avatars 39 and 40 represent the second users 20A and 20B positioned in the blind spot of the first user 10. Then, in a case where the second user 20A positioned in the blind spot makes a remark, the avatar 40 performing the sign language gesture corresponding to the contents of the remark is displayed on the see-through display of the device 100A in an AR manner. In addition, the device 100 may also display text information 41 corresponding to the contents of the remark of the second user 20A in an AR manner. In this way, a remark of another person including a remark of a person in the blind spot is converted into sign language and provided to a hearing-impaired person. This allows a hearing-impaired person to enjoy conversations with a plurality of people without feeling stressed.

It is assumed that the first user 10A makes a positive remark for the second user 20C, but has a negative emotion. In this case, the speech outputted from the device 100 on the basis of the sign language of the first user 10A has a negative voice timbre. This allows the second user 20C to recognize the emotion of the first user 10A. Such conversion based on meta-information independent from the contents of a remark allows detailed communication performed between people such as able-bodied people having the same context to be achieved even between people having different contexts.

In a case where there are a remark of the first user 10 in sign language and a remark of another person, the device 100A outputs speech and displays sign language in an AR manner at the same time.

The device 100A may output information indicating the chronological relationship of communication performed between the plurality of second users 20. For example, in a case where the second user 20A makes a remark as a response to a remark of the second user 20D, the device 100A displays, in an AR manner, emphasis expressions 42 and 43 in association with the second user 20D and the avatar 40. As the emphasis expressions, any expressions may be adopted, for example, such as causing the second user 20D and the avatar 40 themselves to emit light, and surrounding the outlines thereof with translucent lines. The emphasis degree of an emphasis expression may be the highest immediately after a remark is made, and may decrease over time. Such a chronological change in emphasis expressions allows the first user 10 to intuitively recognize the chronological relationship between a plurality of speakers. Note that, for example, the internal state of a speaker such as the degree of confusion may be reflected in this emphasis expression.

The device 100A may operate in the low delay mode in accordance with the tempo of conversations.

<3.1.4. Fourth Use Case>

Figure 8:
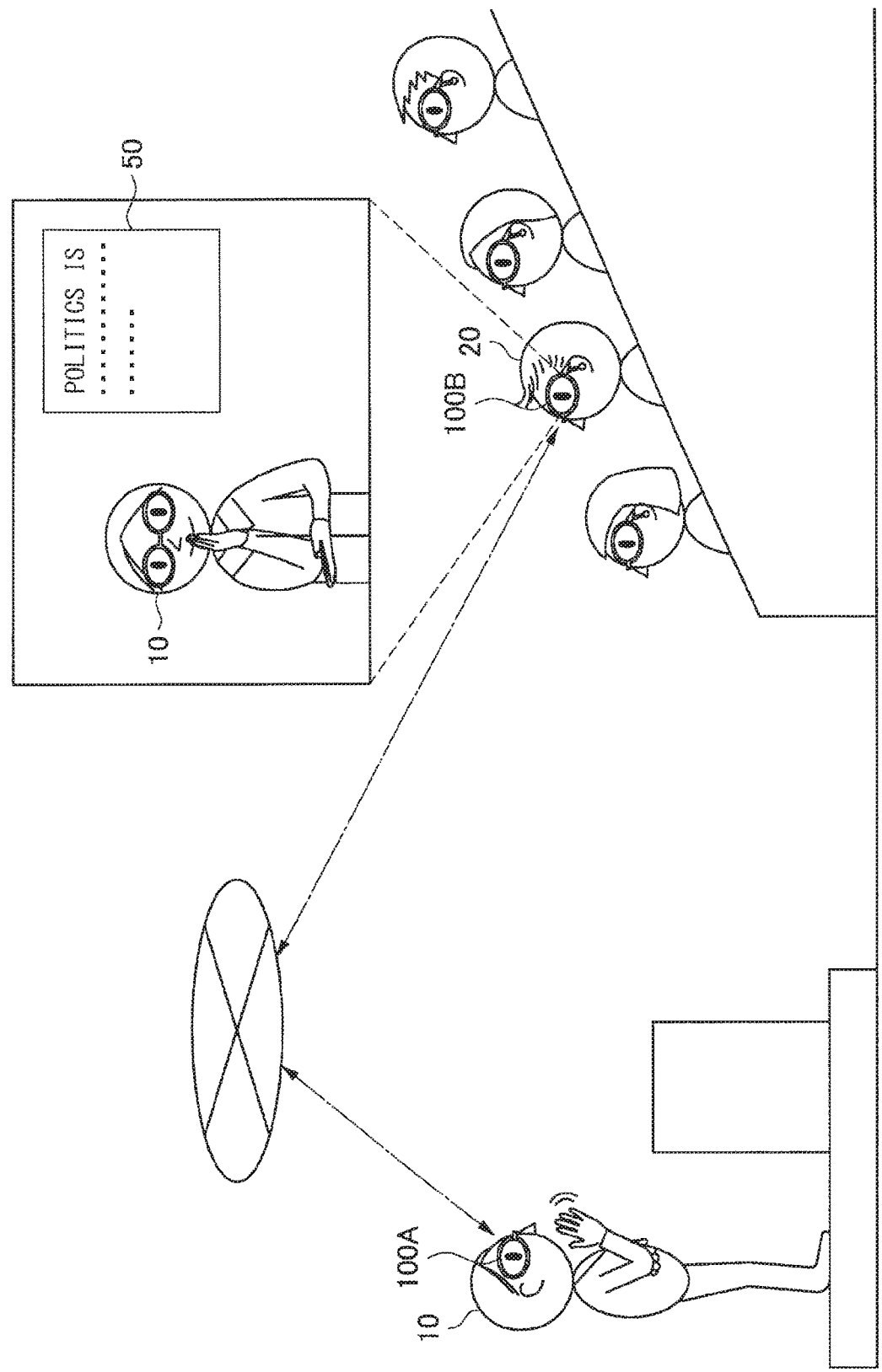
FIG. 8 is a diagram for describing a fourth use case of the working example.

FIG. 8 is a diagram for describing a fourth use case of the first working example. The example illustrated in FIG. 8 is an example in which a lecturer conducts a lecture and a plurality of students takes the lecture at the university. The first user 10 is a lecturer and the second user 20 is a student. The first user 10 is wearing the glass-type device 100A, and the second user 20 is also wearing the glass-type device 100B. Although the wearer of the device 100B is the first user for the device 100B, the wearer is assumed to be the second user 20 because the first user 10 comes into focus and is described here.

The university offers a class with high accessibility that anyone such as able-bodied people, hearing-impaired people, international students, students majoring in humanities, and students majoring in science is able to participate in regardless of language or knowledge. The class is an omnibus class regarding the latest research, and the lecturers also have various specialties, languages, knowledge, and the like. The first user 10 is a hearing-impaired person and conducts a lecture regarding the specialty in the native language of the first user 10. The device 100A performs speech recognition and gesture recognition, and uploads information indicating results of the recognition to the server. The device 100B translates the lecture conducted by the first user 10 in accordance with the context of the language or the like used by the second user 20, and outputs a result of the translation to the second user 20. The output is provided only to the second user 20 wearing the device 100B by making an output from a directional speaker, a bone-conductive speaker, or a display. In a case where the second user 20 makes a remark, the devices 100A also performs the inverse conversion and makes an output.

Here, the first context of the first user 10 and the second context of the second user 20 are different in prerequisite knowledge. In this case, the device 100 converts a first message expressed on the basis of first prerequisite knowledge of the first action subject into a second message. Supplemental information is added to the second message to allow the first message to be understood in second prerequisite knowledge of the second action subject. For example, the device 100B provides the second user 20 with information indicating a description of terminology, a concept specific to the specialty of the first user 10, or the like as supplemental information 50. Detecting an emotion of the second user 20 such as being in trouble or being worried triggers the provision of such supplemental information. This allows the second user 20 to take a lecture without feeling any gap regarding terminology and knowledge. Similarly, the device 100A also provides supplemental information to the first user 10. For example, in a case where the second user 20 asks a question by using a term that is not common in the specialty of the first user 10, the device 100A provides the first user 10 with a description of the term as supplemental information. This allows the first user 10 to understand the intention of the question from the second user 20.

<3.1.5. Fifth Use Case>

FIG. 9 is a diagram for describing a fifth use case of the first working example. The present use case relates to a change in output information corresponding to a change in context.

As illustrated in FIG. 9, the first user 10 is wearing the glass-type device 100. It is assumed that the first user 10 is a hearing-impaired person and a sign language user. The second user 20 is an able-bodied person using spoken language. The first user 10 and the second user 20 work in a factory. When the first user 10 makes a remark in sign language, the device 100 converts the contents of the remark into speech and outputs the speech to the second user 10. When the second user 20 makes a remark in spoken language, the device 100 converts the contents of the remark into a moving image of a sign language gesture, and displays the moving image on the see-through display in an AR manner, thereby outputting the moving image to the first user 10.

In the factory, the factory equipment is in operation, and the danger level is high. Therefore, as illustrated in the left portion of FIG. 9, in the factory, the device 100 displays a moving image 52 at the end of the display in an AR manner. In the moving image 52, an avatar performs the sign language gesture corresponding to the contents of a remark of the second user 20. This allows the first user 10 to check the moving image 52 at the end of the field of view to understand the intention of the second user 20, avoiding looking away. In contrast, the danger level is low outside the factory. Therefore, as illustrated in the right portion of FIG. 9, the device 100 superimposes and displays an arm 54 in an AR manner on the second user 20 displayed on the see-through display outside the factory. The arm 54 is performing the sign language gesture corresponding to the contents of the remark of the second user 20.

In the factory, the factory equipment is in operation, and the noise level is high. Therefore, in the factory, the device 100 outputs, at a high volume, the speech corresponding to the contents of a remark of the first user 10 in sign language. This allows the second user 20 to understand the intention of the first user 10 even in an environment at a high noise level. In contrast, the noise level is low outside the factory. Therefore, outside the factory, the device 100 outputs, at a low volume, the speech corresponding to the contents of a remark of the first user 10 in sign language. Note that the volume may also be controlled in accordance with contexts such as the distance between the first user 10 and the second user 20 and the presence or absence of an obstacle. Controlling the volume in accordance with contexts in this way makes it possible to easily transmit the respective intentions even in an environment where the contexts change.

Note that, in a case where the language used by the second user 20 is different from that of the first user 10, for example, because the second user 20 is a foreigner, conversion is performed between the different languages used similarly to the use case described above.

Further, the contexts of the first user 10 and the second user 20 may be different in culture (i.e., prerequisite knowledge). Examples of the culture include body language and ways for emotions to appear on facial expressions. In this case, the device 100 converts a message and meta-information expressed in a first culture into a message and meta-information expressed in a second culture, thereby generating information indicating the intention of the first action subject. Here, the meta-information is body language, ways for emotions to appear on facial expressions, and the like. For example, the device 100 converts the body language performed in the context of the second user 20 into the body language in the context of the first user 10, and causes an avatar performing a sign language gesture to perform the body language. This allows the first user 10 to correctly estimate the emotion of the second user 20, and smoothly communicate with the second user 20.

<3.1.6. Sixth Use Case>

The present use case relates to communication between spoken language users using different languages such as English or Japanese.

For example, the first user 10 is wearing the device 100 and speaks to converse with the second user 20 who speaks a different language. The device 100 extracts a feature on the basis of sensed speech, and recognizes the languages used by the first user 10 and the second user 20 on the basis of the speech feature, and the contexts of attributes and places. Next, the device 100 uses an acoustic model and a language model to obtain the speech of the speakers as text. The device 100 then reflects the emotion context in a tone and translates the text into the text into the language used by the other user by a statistical technique. Finally, the device 100 performs speech synthesis in which the original speech feature, and the attribute and emotion contexts are reflected, and outputs the speech from a speaker.

<3.1.7. Seventh Use Case>

The present use case relates to communication between users in remote locations.

It is assumed that the first user 10 is wearing the device 100A, and the second user 20 is wearing the device 100B.

In this case, the device 100A performs sensing for the first user 10 and the device 100B performs sensing for the second user 20. The device 100A recognizes the intention of the first user 10 on the basis of an action performed by the first user 10 in the context of the first user 10, and transmits information indicating a result of the recognition to the device 100B. The device 100B generates information indicating the intention of the first user 10 in the context of the second user 20 on the basis of the received result of the recognition of the intention of the first user 10, and outputs the information to the second user 20. Meanwhile, the device 100B recognizes the intention of the second user 20 on the basis of an action performed by the second user 20 in the context of the second user 20, and transmits information indicating a result of the recognition to the device 100A. The device 100A generates information indicating the intention of the second user 20 in the context of the first user 10 on the basis of the received result of the recognition of the intention of the second user 20, and outputs the information to the first user 10. This makes communication possible between users in remote locations.

For example, the first user 10 and the second user 20 may output speech in different situations because of a difference between the contexts of actions or places. In this case, for example, information outputted with the speech of the first user 10 is converted into text information and outputted to the second user 20, and text information inputted by the second user 20 is converted into speech and outputted to the first user 10. In addition, for the input and output of the text information, the output form may be controlled such as displaying only the latest information or the flow of a series of interactions in accordance with the size or the like of the display of the device 100.

The device 100 may select which input form (such as speech input/text input) and output form (such as speech output/text output) are adopted, on the basis of the user schedule, action, positional information, daily activity history, biological information, or the like. For example, the device 100 recognizes a higher-level context regarding a situation such as having a conference, doing desk work, resting, moving, or being at home, on the basis of the context of attributes, places, environments, or activity. The device 100 then selects the appropriate input/output form on the basis the context of the situation of each user to ask for an input. The inputted information is converted into information in the output form corresponding to the context of the situation of the other user, and is outputted to the other user. For example, the device 100 may adopt the text input and the text output if a user has a meeting. The device 100 may select the speech input and the speech output if a user is moving by car. In addition, with respect to the text input, the device 100 may also present, to a user, candidate text such as "having meeting," "coming late," or "being tired" to reduce an input load.

Such processing allows a plurality of users in remote locations to communicate with each other in methods convenient for the respective users without paying attention to a difference between the respective contexts. Even in a case where users have different occupations or living environments, the respective users are able to communicate with each other in methods convenient for the respective users. This makes it possible to easily get in touch with each other.

3.2. Second Working Example

The present working example relates to communication between a human and a device. The following describes the overview of the present working example with reference to FIG. 10.

FIG. 10 is a diagram for describing the overview of a second working example. As illustrated in FIG. 10, the user 10 is wearing the wristband-type device 100. The communication target 20 includes a camera 20A, PC 20B, a TV receiver 20C, and a smartphone 20D. The camera 20A includes a display, and is able to display an image shot in the past. The first user 10 performs a pinching action toward the camera 20A, and moves the pinching hand toward the PC 20B and performs a releasing action. Performing such a drag-and-drop action causes the device 100 to transfer the image from the camera 20A to the PC 20B. Specifically, the device 100 sets, in a transmission mode, the camera 20A to be subjected the pinching action, sets, in a reception mode, the PC 20B to be subjected to the releasing action, and couples the camera 20A and the PC 20B to each other. These two devices are then coupled to each other, for example, by a communication path conforming to any wireless communication standard such as BLE (Bluetooth Low Energy (registered trademark)) or Wi-Fi (registered trademark) to cause data to be transmitted and received. This causes the image to be transferred to the PC 20B and displayed. Similarly, when the user 10 performs a drag-and-drop action on an image displayed on the PC 20B from the PC 20B to the TV receiver 20C, the image is transferred from the PC 20B to the TV receiver 20C and displayed on the TV receiver 20C. Similarly, when the user 10 performs a drag-and-drop action on an image displayed on the TV receiver 20C from the TV receiver 20C to the smartphone 20D, the image is transferred from the TV receiver 20C to the smartphone 20D and displayed on the smartphone 20D.

In the present working example, the communication target 20 is a device. The context of the user 10 is a mental model regarding the operation of the device, and the context of the device 20 is an operation method. The user 10 performs an action for causing the device 20 to perform an action desired to be performed by the device 20, in accordance with the mental model of the user 10. The device 100 recognizes the intention of the user 10 that is, in other words, the action which the user 10 has caused the device 20 to perform, in accordance with the mental model of the user 10. The device 100 generates a control command for causing the device 20 to perform the action desired to be performed, and outputs the control command to the device 20. This allows the user 10 to operate the device 20 at will with the support of the device 100 by operating the device 20 in the operation method expected by the user 10, even if the operation method is different from the actual operation method of the device 20.

The generation of a control command is described in detail with respect to the example described with reference to FIG. 10. First, the device 100 recognizes the positional relationship between the user 10 and the device 20 on the basis of the contexts of places and adjacency, and recognizes whether or not the device 20 is included in operation targets. The device 100 then performs gesture recognition or speech recognition to acquire a common-ruled command corresponding to a result of the recognition. Then, on the basis of the context of the attributes of the device 20, the device 100 converts the common-rule command into a control command of the device 20, and transmits the control command to the device 20. Performing such context-based conversion allows the user 10 to cause the device 20 to perform, in the same operation method, the same action that is originally performed in a different operation method. For example, it is possible to transfer an image by the same drag-and-drop operation.

With respect to the example described above with reference to FIG. 10, the transmission and reception of data between the devices 20 is described in detail. First, the device 100 performs gesture recognition for the user 10. In a case of a pinching action, the device 100 recognizes the device 20 that is a transmission source on the basis of the contexts of attributes, places, and adjacency. The device 100 then performs gesture recognition on the action of the user 10 to release a finger, and recognizes the device 20 that is a transmission destination on the basis of the contexts of attributes, places, and adjacency. Finally, the device 100 causes a communication path to be established between these two devices 20, and causes data to be transmitted and received.

In this way, according to the present working example, the user 10 is able to operate the different devices 20 in the same operation method without being conscious of a difference between the operation methods of the respective devices 20, the presence or absence of physical coupling, and the like.

Next, the detailed flow of processing in the example illustrated in FIG. 10 is described with reference to FIG. 11. FIG. 11 is a flowchart illustrating an example of the flow of communication support processing executed in the system 1 according to the present working example.

Sensing

First, the device 100 (i.e., the sensor section 110) performs sensing (step S200).

For example, the wristband-type device 100 senses a motion of a hand by sensing acceleration and angular velocity. In addition, the device 100 senses the positional relationship between the user 10 and the device 20 by sensing the radio wave intensity and magnetism of BLE. Needless to say, the device 100 may perform sensing with a myoelectric potential sensor, a distance measurement sensor, and the like, or may acquire sensing information from the other device 100 such as the glass-type device 100. This is expected to improve the performance of the device 100.

Recognition of Context

The device 100 (i.e., the context recognizer 131) then recognizes a context.

Specifically, the device 100 recognizes the context of adjacency (step S210). For example, the device 100 recognizes the device 20 adjacent to the user 10 on the basis of sensing information obtained by a camera. The threshold of the distance that makes it possible to recognize that the device 20 is adjacent may be set for each device 20. The maximum distance may be, for example, the range within which the radio waves of BLE reach. In addition, the device 100 also recognizes the positional relationship between the devices 20.

Conversion

After the above-described recognition of the contexts, the device 100 (i.e., the intention recognizer 133) converts information indicating the intention of the user, on the basis of a difference between the contexts.

Specifically, first, the device 100 recognizes a drag-and-drop operation of the user 10 (step S220).

The device 100 then generates a common command corresponding to the recognized drag-and-drop operation (step S222). For example, the device 100 may classify actions of the user 10 into the three patterns of a pinching action, a releasing action, and the others. Then, the device 100 recognizes the device 20 in the direction of the pinching fingers of the user 10 as the device 20 that is a transmission source, and recognizes the device 20 in the direction in which the user 10 releases the fingers as the device 20 that is a transmission destination. The target file is, for example, a file displayed on the device 20 that is a transmission source. The device 100 then generates a common command for establishing a communication path and a common command for transmitting and receiving a target file. Note that, in a case where the two or more devices 20 are not adjacent, or in a case where the device 20 is not present in the direction of the pinching fingers or the direction in which the finger are released, no common commands are generated, but the processing returns to the step S200 again.

Next, the device 100 converts the common commands into control commands of each device 20 on the basis of the context of the attributes of each device 20 (step S224).

Output Conversion

After the conversion processing described above, the device 100 (i.e., the output converter 135) converts information indicating the intention of a user into output information.

Specifically, the device 100 converts the control commands of the respective devices 20 into information corresponding to the protocols for communication with the respective devices 20 (step S230).

Output

After the generation processing described above, the device 100 (i.e., the output section 140) outputs output information to the device 20.

Specifically, the device 100 transmits a control command corresponding to the protocol of each device 20 to each device 20. This causes a communication path to be established between the device 20 that is a transmission source and the device 20 that is a transmission destination, and causes the target file to be transferred from the device 20 that is a transmission source to the device 20 that is a transmission destination (step S240).

4. EXAMPLE OF USE CASE

The following describes an example of a use case of the system 1.

First, an example of a service provided from the device 100 in a case where a user performs a speaking action is described. For example, there may be provided mutual interpretation between spoken language users having different contexts of languages used. For example, with respect to communication between users having different activity or place contexts, there may be provided a telephone that is usable without paying attention to the situation of the other user. For example, with respect to communication between users having contexts of sound field environments, there may be provided a telephone that is usable without paying attention to the sound field environment of the other user. For example, with respect to communication between users having different contexts of emotions, there may be provided a dialogue support that encourages the other user to be calm and allows the other user to speak as usual. For example, with respect to communication between users having different contexts of prerequisite knowledge, there may be provided a dialogue support that outputs, to the second user 20, information indicating an emotion of confusion as to a remark of the second user 20 that is difficult to understand, and provides the first user 10 with supplemental information to compensate for a difference in the prerequisite knowledge. For example, with respect to communication between users having different contexts of attributes, preferences, and physical conditions, the device 100 may provide a dialogue support that provides supplemental information of the attributes, preferences, and physical conditions of the other user. This allows a user to contact another user whom the user meets for the first time or a robot as if they were old friends.

Then, an example of a service provided from the device 100 in a case where a user performs a gesture is described. For example, there may be provided mutual interpretation between a sign language user and spoken language user having different contexts of languages used. For example, there is provided a service that sets, in the transmission mode, a device A to be subjected to the pinching action, sets, in the reception mode, a device B to be subjected to the releasing action, and mediates communication between both devices when a user performs a drag-and-drop action from the device A to the device B. For this service, the context of devices is used for a user, and the communication context is used for a device. For example, there is provided a user interface that makes a mouse input to PC with a gesture of moving a mouse in a case where a user is sitting to work, and flips a page and moves a pointer with gestures in a case where a user makes a presentation in a conference room. For this service, the contexts of places and activity are used.

Next, an example of a service provided from the device 100 in a case where a user performs a touching action is described. For example, in a case where a user touches a Braille display, the height of a raised dot of Braille may be controlled in accordance with the context of air temperature, or in accordance with the internal context such as numb hands or gloved hands. For example, with respect to UI of a smartphone, the character size or coloration of the UI may be controlled in accordance with the context of attributes such as the elderly or visually-impaired people, or in accordance with the internal context such as the mood of a user.

Finally, an example of a service provided from the device 100 in a case where a user performs another action is described. For example, in a case where the device 100 is a glove-type or clothing-type wearable device (e.g., a powered suit), assisting force may be provided as appropriate in accordance with the weight of an object a user desires to move and the ability (e.g., muscular strength) of the user.

5. HARDWARE CONFIGURATION EXAMPLE

Finally, the hardware configuration of an information processing device according to the present embodiment is described with reference to FIG. 12. FIG. 12 is a block diagram illustrating an example of the hardware configuration of the information processing device according to the present embodiment. Note that an information processing device 900 illustrated in FIG. 12 may achieve, for example, the device 100 illustrated in FIG. 2. Information processing performed by the device 100 according to the present embodiment is achieved by software in cooperation with hardware described below.

As illustrated in FIG. 12, the information processing device 900 includes CPU (Central Processing Unit) 901, ROM (Read Only Memory) 902, RAM (Random Access Memory) 903, and a host bus 904a. In addition, the information processing device 900 includes a bridge 904, an external bus 904b, an interface 905, an input unit 906, an output unit 907, a storage unit 908, a drive 909, a coupling port 911, and a communication unit 913. The information processing device 900 may include a processing circuit such as an electrical circuit, DSP, or ASIC instead of the CPU 901 or along therewith.

The CPU 901 functions as an arithmetic processing unit and a control unit and controls the overall operation in the information processing device 900 according to various programs. Further, the CPU 901 may be a microprocessor.

The ROM 902 stores programs, operation parameters, and the like used by the CPU 901. The RAM 903 temporarily stores programs used in execution of the CPU 901, parameters appropriately changed in the execution, and the like. The CPU 901 may be included, for example, in the control section 130 illustrated in FIG. 2.

The CPU 901, the ROM 902, and the RAM 903 are coupled to each other by the host bus 904a including a CPU bus and the like. The host bus 904a is coupled to the external bus 904b such as a PCI (Peripheral Component Interconnect/Interface) bus via the bridge 904. Note that the host bus 904a, the bridge 904, and the external bus 904b are not necessarily separately configured, but the functions thereof may be implemented in a single bus.

The input unit 906 is achieved by a unit through which a user inputs information, such as a mouse, a keyboard, a touch panel, a button, a microphone, a switch, and a lever, for example. In addition, the input unit 906 may be a remote control unit using infrared rays or other electric waves, or an external coupling unit such as a mobile phone or PDA supporting an operation of the information processing device 900, for example. Furthermore, the input unit 906 may include an input control circuit or the like which generates an input signal on the basis of information inputted by the user using the input means described above and outputs the input signal to the CPU 901, for example. The user of the information processing device 900 may input various kinds of data or instructs the information processing device 900 to perform a processing operation by operating this input unit 906.

Additionally, the input unit 906 may include a unit that detects information regarding a user. For example, the input unit 906 may include a variety of sensors such as an image sensor (e.g., camera), a depth sensor (e.g., stereo-camera), an acceleration sensor, a gyro sensor, a geomagnetic sensor, an optical sensor, a sound sensor, a distance measurement sensor, and a force sensor. In addition, the input unit 906 may acquire information regarding the state of the information processing device 900 itself, such as the attitude and moving speed of the information processing device 900, and information regarding the environment around the information processing device 900, such as the brightness and noise around the information processing device 900. In addition, the input unit 906 may include a GNSS (Global Navigation Satellite System) module that receives, for example, GNSS signals (such as GPS (Global Positioning System) signals from a GPS satellite) from a GNSS satellite, and measures positional information including the latitude, longitude, and altitude of the unit. In addition, with respect to the positional information, the input unit 906 may detect the position through Wi-Fi (registered trademark), transmission and reception to and from a mobile phone/PHS/smartphone, near field communication, or the like. The input unit 906 can be included, for example, in the sensor section 110 illustrated in FIG. 2. In addition, the external sensor device 200 illustrated in FIG. 2 may include a component similar to the input unit 906 described above.

The output unit 907 includes a unit that is able to visually or aurally notify the user of acquired information. Such a unit includes a display unit such as a CRT display unit, a liquid crystal display unit, a plasma display unit, an EL display unit, a laser projector, an LED projector, and a lamp, an audio output unit such as a speaker and a headphone, a printer unit, and the like. The output unit 907 outputs results acquired through various kinds of processing performed by the information processing device 900, for example. Specifically, the display unit visually displays results acquired through various kinds of processing performed by the information processing device 900, in various forms such as text, images, tables, and graphs. Meanwhile, the audio output unit converts audio signals including reproduced audio data, acoustic data, and the like into analog signals, and aurally outputs the analog signals. The output unit 907 may be included, for example, in the output section 140 illustrated in FIG. 2. In addition, the external output device 400 illustrated in FIG. 2 may include a component similar to the output unit 907 described above.

The storage unit 908 is a unit for data storage that is formed as an example of a storage section of the information processing device 900. For example, the storage unit 908 is achieved by a magnetic storage section device such as HDD, a semiconductor storage device, an optical storage device, a magneto-optical storage device, or the like. The storage unit 908 may include a storage medium, a recording unit that records data in the storage medium, a reading unit that reads data from the storage medium, a deletion unit that deletes data recorded in the storage medium, and the like. This storage unit 908 stores programs and various kinds of data to be executed by the CPU 901, various kinds of data acquired from the outside, and the like. The storage unit 908 may be included, for example, in the storage section 120 illustrated in FIG. 2. In addition, the server 300 illustrated in FIG. 2 may include a component similar to the storage 908 described above.

The drive 909 is a reader/writer for a storage medium, and is incorporated in or externally attached to the information processing device 900. The drive 909 reads information recorded in a removable storage medium such as a magnetic disk, an optical disc, a magneto-optical disk, or a semiconductor memory mounted thereon, and outputs the information to the RAM 903. In addition, the drive 909 is also able to write information into the removable storage medium.

The coupling port 911 is an interface coupled to external device, and is a coupling port to an external device through that is able to transmit data through USB (Universal Serial Bus) and the like, for example.

The communication unit 913 is a communication interface including, for example, a communication device and the like for coupling to a network 920. The communication unit 913 is, for example, a communication card or the like for wired or wireless LAN (Local Area Network), LTE (Long Term Evolution), Bluetooth (registered trademark), or WUSB (Wireless USB). In addition, the communication unit 913 may be a router for optical communication, a router for ADSL (Asymmetric Digital Subscriber Line), a modem for various kinds of communication, or the like. For example, this communication unit 913 is able to transmit and receive signals and the like to and from the Internet and another communication device in accordance with a predetermined protocol such as, for example, TCP/IP. In the present embodiment, the communication unit 913 functions as a communication interface between the device 100, and the external sensor device 200, the server 300, and the external output device 400.

Note that the network 920 is a wired or wireless transmission path for information transmitted from a device coupled to the network 920. For example, the network 920 may include public networks such as the Internet, a telephone network, and a satellite communication network, various LAN (Local Area Networks) and WAN (Wide Area Networks) including Ethernet (registered trademark), and the like. In addition, the network 920 may include leased line networks such as IP-VPN (Internet Protocol-Virtual Private Network).

An example of the hardware configuration that is able to achieve the functions of the information processing device 900 according to the present embodiment has been described above. The respective components described above may be achieved by using general-purpose members, or may be achieved by hardware specific to the functions of the respective components. Accordingly, the hardware configuration to be used is changeable as appropriate in accordance with the technical level at the time of carrying out the present embodiment.

Note that a computer program that achieves each of the functions of the information processing device 900 according to the present embodiment as described above may be created, and may be implemented in PC or the like. In addition, it is possible to provide a computer-readable recording medium storing such a computer program. The recording medium is, for example, a magnetic disk, an optical disc, a magneto-optical disk, a flash memory, or the like. In addition, the computer program described above may be distributed, for example, through a network without using a recording medium.

6. CONCLUSION

An embodiment of the present disclosure has been described in detail with reference to FIGS. 1 to 12. As described above, the device 100 according to the present embodiment recognizes the intention of the first action subject that is one of the user 10 or the communication target 20 of the user 10 on the basis of an action performed by the first action subject in the first context. The intention recognizer 133 then generates information indicating the intention of the first action subject in the second context of the second action subject that is the other of the user 10 or the communication target 20 of the user 10. In other words, the device 100 converts an action performed by the first action subject into information having the equivalent meaning in the second context. The same action may have different meaning in a different context. Such conversion thus allows the first action subject to communicate without being conscious of a difference from the context of the second action subject. In addition, the second action subject is also provided with information conforming to the context of the second action subject. This allows the second action subject to communicate without being conscious of a difference from the context of the first action subject. In this way, it is possible to make communication smoother between the user 10 and the communication target 20.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that they will naturally come under the technical scope of the present disclosure.

Note that each of the units described herein may be implemented as a single unit, or a portion or all of the units described herein may be implemented different units. For example, in the functional component example of the device 100 illustrated in FIG. 2, the storage section 120 and the control section 130 may be included in a device such as a server that is coupled to the sensor section 110 and the output section 140 through a network or the like.

In addition, the processing described by using the flowcharts and the sequence diagrams in this specification does not necessarily have to be executed in the illustrated order. Some of the processing steps may be executed in parallel. In addition, an additional processing step may be adopted, and some of the processing steps may be omitted.

Furthermore, the effects described herein are merely illustrative and exemplary, and not limiting. That is, the technique according to the present disclosure can exert other effects that are apparent to those skilled in the art from the description herein, in addition to the above-described effects or in place of the above-described effects.

It should be noted that the following configurations are also fall within the technical scope of the present disclosure.

(1)

An information processing device including a control section that recognizes an intention of a first action subject on the basis of an action performed by the first action subject in a first context, generates information indicating the intention of the first action subject in a second context of the second action subject, and causes the information to be outputted to the second action subject, the first action subject being one of a user or a communication target of the user, the second action subject being another of the user or the communication target of the user.

(2)

The information processing device according to (1), in which the communication target is another user, different languages are used in the first context and the second context, and the control section converts a message expressed by using a first language into a message expressed by using a second language, thereby generating the information indicating the intention of the first action subject.

(3)

The information processing device according to (2), in which the control section converts a message expressed by the first action subject using spoken language into a moving image of an avatar performing a sign language gesture corresponding to the message.

(4)

The information processing device according to (2), in which the control section converts a message expressed by the first action subject using spoken language into a moving image of a hand performing a sign language gesture corresponding to the message, the sign language gesture being superimposed and displayed on the first action subject in an AR manner, the first action subject being displayed on a transmissive display.

(5)

The information processing device according to any one of (2) to (4), in which the control section converts meta-information of the message expressed by using the first language into meta-information of the message expressed by using the second language.

(6)

The information processing device according to (5), in which the meta-information of a message expressed by using spoken language includes information indicating speaking speed or voice volume.

(7)

The information processing device according to (5), in which the meta-information of a message expressed by using sign language includes information indicating gesture speed or gesture size.

(8)

The information processing device according to any one of (2) to (7), in which the control section performs the conversion for each word.

(9)
The information processing device according to any one of (2) to (8), in which the control section outputs, to the user, information indicating a chronological relationship of communication performed between a plurality of the communication targets.

(10)
The information processing device according to any one of (1) to (9), in which
the communication target is another user,
the first context and the second context are different in prerequisite knowledge, and
the control section converts a first message expressed on the basis of first prerequisite knowledge into a second message having supplemental information added thereto to cause the first message to be understood in second prerequisite knowledge.

(11)
The information processing device according to any one of (1) to (10), in which
the communication target is another user, and
the control section recognizes the intention of the user on the basis of an action performed by the user in a first context, transmits information indicating a result of the recognition to another information processing device, generates information indicating an intention of the other user in the first context, on the basis of information that is received from the other information processing device and indicates a result of recognition of the intention of the other user, and causes the information to be outputted to the user.

(12)
The information processing device according to (1), in which
the communication target is a device,
the intention is an action that the user desires the device to perform, and
the control section generates a control command for causing the device to perform the action desired to be performed, and outputs the control command to the device.

(13)
The information processing device according to (12), in which the control section causes a communication path to be established between a plurality of the devices, and causes data to be transmitted and received.

(14)
The information processing device according to any one of (1) to (13), in which the control section recognizes the first context, the second context, or an action performed by the first action subject, on the basis of information sensed by a device worn by the user.

(15)
The information processing device according to any one of (1) to (14), in which the control section causes a device worn by the user to output the information indicating the intention of the first action subject to the second action subject.

(16)
An information processing method including
recognizing an intention of a first action subject on the basis of an action performed by the first action subject in a first context, generating information indicating the intention of the first action subject in a second context of the second action subject, and causing an output device to output the information to the second action subject, the first action subject being one of a user or a communication target of the user, the second action subject being another of the user or the communication target of the user.

(17)
A recording medium having a program recorded thereon, the program causing a computer to function as
a control section that recognizes an intention of a first action subject on the basis of an action performed by the first action subject in a first context, generates information indicating the intention of the first action subject in a second context of the second action subject, and causes the information to be outputted to the second action subject, the first action subject being one of a user or a communication target of the user, the second action subject being another of the user or the communication target of the user.

REFERENCE SIGNS LIST

1: System
10: User, First user
20: Communication target, Second user, Device
100: Device
110: Sensor section
120: Storage section
130: Control section
131: Context recognizer
133: Intention recognizer
135: Output converter
140: Output section
200: External sensor device
300: Server
400: External output device

The invention claimed is:
1. A first information processing device, comprising:
circuitry configured to:
recognize an intention of a first action subject based on a first message expressed by the first action subject in a first context, wherein the first message is in a first language;
convert the first message in the first language into a second message in a second language, wherein
the second message is in a second context of a second action subject, and
the first language is different from the second language;
convert first meta-information of the first message into second meta-information of the second message, wherein the first meta-information indicates at least one of a speaking speed or a voice volume;
generate first information indicating the intention of the first action subject in the second context of the second action subject, based on the conversion of the first message and the conversion of the first meta-information of the first message; and
control output of the first information to the second action subject, wherein
the first action subject is a first user, and
the second action subject is a communication target of the first user.

2. The first information processing device according to claim 1, wherein the communication target is a second user.

3. The first information processing device according to claim 2, wherein
the first message expressed by the first action subject is in a spoken language, and
the second message is a moving image of an avatar performing a sign language gesture corresponding to the first message.

4. The first information processing device according to claim 2, wherein
the first message expressed by the first action subject is in a spoken language,
the second message is a moving image of a hand performing a sign language gesture corresponding to the first message,
the sign language gesture is superimposed and displayed on an image of the first action subject in an augmented reality (AR) manner, and
the image of the first action subject is displayed on a transmissive display.

5. The first information processing device according to claim 2, wherein the circuitry is further configured to execute the conversion of the first message for each word of a plurality of words in the first message.

6. The first information processing device according to claim 2, wherein the circuitry is further configured to output, to the first user, second information indicating a chronological relationship of communication performed between a plurality of communication targets of the first user.

7. The first information processing device according to claim 1, wherein the second meta-information of the second message indicates at least one of a gesture speed or a gesture size.

8. The first information processing device according to claim 1, wherein
the communication target is a second user,
the first context and the second context are different in prerequisite knowledge,
the circuitry is further configured to convert the first message, expressed based on first prerequisite knowledge, into the second message having supplemental information added thereto, and
the supplemental information causes the first message to be understood in second prerequisite knowledge.

9. The first information processing device according to claim 1, wherein
the communication target is a second user, and
the circuitry is further configured to:
transmit second information indicating a result of the recognition of the intention of the first user to a second information processing device;
generate third information indicating an intention of the second user in the first context, based on fourth information from the second information processing device, wherein the fourth information indicates a result of recognition of the intention of the second user; and
control output of the third information to the first user.

10. The first information processing device according to claim 1, wherein
the communication target is a device of a plurality of devices,
the intention is an action that the first user intends the device to perform, and
the circuitry is further configured to:
generate a control command to control the device to perform the action, and
output the control command to the device.

11. The first information processing device according to claim 10, wherein the circuitry is further configured to establish a communication path between the plurality of devices.

12. The first information processing device according to claim 1, wherein the circuitry is further configured to recognize at least one of the first context, the second context, or an action performed by the first action subject, based on second information sensed by a device worn by the first user.

13. The first information processing device according to claim 1, wherein the circuitry is further configured to control a device, worn by the first user, to output the first information to the second action subject.

14. An information processing method, comprising:
recognizing an intention of a first action subject based on a first message expressed by the first action subject in a first context, wherein the first message is in a first language;
converting the first message in the first language into a second message in a second language, wherein
the second message is in a second context of a second action subject, and
the first language is different from the second language; and
converting first meta-information of the first message into second meta-information of the second message, wherein the first meta-information comprises at least one of a speaking speed or a voice volume;
generating information indicating the intention of the first action subject in the second context of the second action subject, based on the conversion of the first message and the conversion of the first meta-information of the first message; and
controlling an output device to output the information to the second action subject, wherein
the first action subject is a user, and
the second action subject is a communication target of the user.

15. A non-transitory computer-readable medium having stored thereon computer-executable instructions which, when executed by a computer, cause the computer to execute operations, the operations comprising:
recognizing an intention of a first action subject based on a first message expressed by the first action subject in a first context, wherein the first message is in a first language;
converting the first message in the first language into a second message in a second language, wherein
the second message is in a second context of a second action subject, and
the first language is different from the second language; and
converting first meta-information of the first message into second meta-information of the second message, wherein the first meta-information comprises at least one of a speaking speed or a voice volume;
generating information indicating the intention of the first action subject in the second context of the second action subject based on the conversion of the first message and the conversion of the first meta-information of the first message; and
controlling output of the information to the second action subject, wherein
the first action subject is a user, and
the second action subject is a communication target of the user.

* * * * *